(12) United States Patent
van Winkle

(10) Patent No.: US 11,865,455 B2
(45) Date of Patent: Jan. 9, 2024

(54) ARCADE MACHINE STRATEGY GUIDES

(71) Applicant: Paradigm Tilt LLC, Seattle, WA (US)

(72) Inventor: Anthony Michael van Winkle, Seattle, WA (US)

(73) Assignee: Paradigm Tilt LLC, Seattle, WA (US)

( * ) Notice: Subject to any disclaimer, the term of this patent is extended or adjusted under 35 U.S.C. 154(b) by 127 days.

(21) Appl. No.: 17/510,750

(22) Filed: Oct. 26, 2021

(65) Prior Publication Data

US 2023/0129391 A1 Apr. 27, 2023

(51) Int. Cl.
*A63F 13/65* (2014.01)
*A63F 13/69* (2014.01)
*A63F 7/02* (2006.01)

(52) U.S. Cl.
CPC .............. *A63F 13/65* (2014.09); *A63F 7/027* (2013.01); *A63F 13/69* (2014.09); *A63F 2300/1031* (2013.01); *A63F 2300/1093* (2013.01); *A63F 2300/305* (2013.01)

(58) Field of Classification Search
CPC .......... A63F 13/65; A63F 13/69; A63F 7/027; A63F 2300/1031; A63F 2300/1093; A63F 2300/305
USPC ............................................................ 463/1
See application file for complete search history.

(56) References Cited

U.S. PATENT DOCUMENTS

| | | | |
|---|---|---|---|
| 6,663,492 B2* | 12/2003 | Thompson .............. | A63F 13/45 463/43 |
| 8,753,183 B2* | 6/2014 | Davison ................ | A63F 13/355 463/9 |
| 9,597,600 B2* | 3/2017 | Chung .................... | A63F 13/61 |
| 10,874,947 B2* | 12/2020 | Benedetto ............... | A63F 13/85 |
| 2008/0004117 A1* | 1/2008 | Stamper ................. | G07F 17/32 463/42 |
| 2008/0194333 A1* | 8/2008 | Zalewski ............ | A63F 13/5375 463/43 |
| 2015/0067745 A1* | 3/2015 | Fear ........................ | A63F 13/00 725/93 |

* cited by examiner

*Primary Examiner* — Allen Chan
(74) *Attorney, Agent, or Firm* — FIG. 1 Patents

(57) ABSTRACT

A strategy system is described that generates a strategy guide for a gameplay session at an arcade machine. To do so, the strategy system leverages a game-specific hash generated by a hashing system, which includes data describing a log of events that occurred during the gameplay session. The strategy guide includes a summary of the gameplay session curated based on a combination of a particular user associated with the gameplay session, a rulebook describing gameplay event scoring, and the specific event sequence described in the game-specific hash. The game-specific hash and the strategy guide are configured for output based on various considerations, such as display capabilities and network connections of the computing devices implementing the strategy system and/or the hashing system as well as characteristics of a computing device at which the strategy guide is output.

20 Claims, 10 Drawing Sheets

```
"key": "15",
"name": "prepare for Launch",
"summary": "Launching your ship is the first step to unlocking space-level missions. prepare for launch by
completing all three pre-launch objectives before the timer expires. Achieving launch doubles standard
playfield scoring values.",
"description": "All lanes are open - a complete ramp shot resets the timer. Hit three shots to complete.",
"resume": true,
"timer_set": 10,
"image": "launchpad.png",
"color": "0066ff",
"statuses": [
    {
        "name": "Locked",
        "instructions": "Hit all drop targets during ground-level gameplay to begin preparing for
launch."
    },
    {
        "name": "unlocked",
        "instructions": "Activate mission select with five bumper hits and select 'Launch'."
    },
    {
        "name": "Mission Abort",
        "instructions": "You failed to complete the pre-launch objectives in the allotted time."
    },
    {
        "name": "Fueling Complete",
        "instructions": "You hit one ramp shot. Two more to go!"
    },
    {
        "name": "Crew Aboard",
        "instructions": "You hit two ramp shots. One more to go!"
    },
    {
        "name": "Launch Complete",
        "instructions": "Houston, we have liftoff."
    }
]
```

Fig. 6

ARCADE MACHINE STRATEGY GUIDES

BACKGROUND

Arcade games are designed to attract player attention and encourage gameplay, often including stylized graphics, lights, sounds, and so forth to do so. For example, pinball machines are traditionally glass-covered cabinet arcade games, where a player navigates a ball in a playfield using flippers to hit bumpers, ramps, targets, and other objects during gameplay before the ball drains. Pinball gameplay typically includes multiple turns, where the playfield is reset between each turn, and an overall score for a game is aggregated from scores achieved during each turn.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

FIG. 6 depicts examples of code describing modes and states associated with gameplay for an arcade machine.

DETAILED DESCRIPTION

Overview

Figure 1:
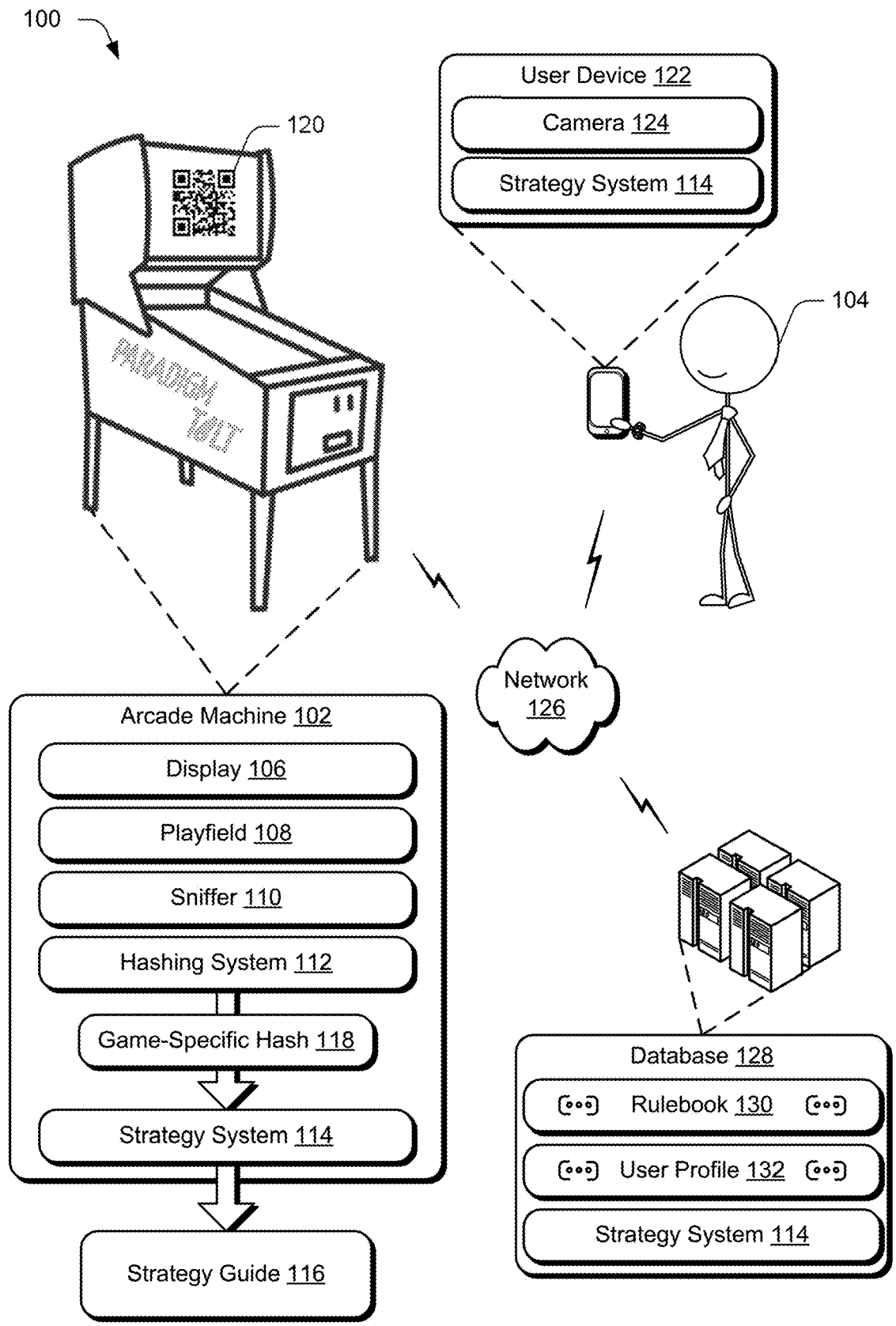
FIG. 1 is an illustration of an environment in an example implementation that is operable to generate a strategy guide based on a gameplay session at an arcade machine.

Arcade machines are traditionally designed to attract users and excite during gameplay, frequently being styled in accordance with an overall theme for the game. Gameplay mechanics are governed by rules coded into the arcade machine to define how the arcade machine responds to certain events or sequences of events during a gameplay session. For instance, the rules may include instructions for assigning points to certain events given a current gameplay mode or state, which are aggregated to score the gameplay session. Consequently, the rules for a given arcade machine may include numerous (e.g., millions) of different stipulations that influence a gameplay session experience for a user of the arcade machine.

The arcade machines implementing these rules, however, are designed to convey only a small portion of information included in the rules. For example, conventional arcade machines employ a counter that updates over the course of a gameplay session to track a score associated with the gameplay session, but otherwise output no further information regarding how scoring mechanics operate. Consequently, for many arcade machines, even the most enthusiastic players are unaware as to what happens "under the hood" during a gameplay session. Some modern arcade machines are outfitted with displays capable of conveying additional information, such as instructions for achieving an active objective during gameplay. However, the fast-paced nature of arcade games and requisite focus on a playfield separate from the displays makes it impractical for a user to comprehensively understand how individual gameplay events influence other gameplay events and a score for the gameplay session. To further compound these problems, conventional arcade machines are designed to reset after each session, wiping from memory all but a fraction of historical gameplay data at the machine (e.g., machines configured to maintain a leaderboard specifying only the top ten overall scores). Consequently, users are often unaware of what really happened during a gameplay session to influence a resulting score and provided with a single number representing the resulting score.

To address these problems, a strategy system is described that generates a strategy guide for a gameplay session at an arcade machine. To do so, the strategy system works in conjunction with a hashing system integrated into the arcade machine. The hashing system is configured to monitor and record a sequence of events occurring at the arcade machine over the course of the gameplay session and generate a hash that identifies the sequence of events based on a rulebook describing rules governing the gameplay session. In some implementations, the strategy system is also integrated into the arcade machine. Alternatively, using the techniques described herein, the strategy system is implemented at a computing device other than the arcade machine, such as at a database or at a user computing device (e.g., a mobile phone of the user playing the arcade machine).

In situations where the strategy system is implemented remotely from the arcade machine, the hashing system is configured to generate a machine-readable code that includes the hashed information and transmit the machine-readable code to the computing device implementing the strategy system. For example, the hashing system generates a QR code and outputs the QR code at a display of the arcade machine. The user playing the arcade machine can then capture (e.g., using a mobile device camera) the QR code to obtain data described in the hash and provide the data to the strategy system. The strategy system then generates the strategy guide in a bespoke manner, customized based on the specific sequence of events that occurred during the gameplay session. Additionally, the strategy system is configured to identify the user playing the arcade machine and leverage historical data for the user to further tailor the strategy guide for the specific user.

Using the techniques described herein, the strategy guide is configured to prioritize rulebook information based on various criteria, including the specific sequence of events in a given gameplay session, historical user profile data, computing device data transmission capabilities, computing device display capabilities, combinations thereof, and so forth. Strategy guides generated using techniques described herein are thus advantageously configured to include information not designated for output during gameplay and information incapable of being output by hardware and/or software components of the arcade machine.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes an arcade machine 102, which is configurable in a variety of manners.

The arcade machine 102, for instance, is configurable as an electro-mechanical game (e.g., a pinball machine, a pachinko machine, etc.), a mechanical game (e.g., a skee-ball machine, an indoor basketball game, etc.), an arcade video game (e.g., Pac-Man, Space Invaders, etc.) and so forth. As described herein, the arcade machine 102 refers to a machine that requires at least one mechanical action from a player (e.g., user 104) of the arcade machine, such that the dominant factor influencing an outcome of the arcade machine 102 (e.g., a final game score) is skill rather than chance. In the following description, the arcade machine 102 is described in the example context of being implemented as a pinball machine.

The arcade machine 102 is configured with a display 106, a playfield 108, a sniffer 110, a hashing system 112, and a strategy system 114. Each of the display 106, the playfield 108, the sniffer 110, the hashing system 112, and the strategy system 114 represent a component that is implemented at least partially in hardware of the arcade machine 102. The display 106 is representative of functionality of the arcade machine 102 to visually output information to the user 104 using one or more lights, mechanical wheels, a light-emitting diode (LED) display, a dot-matrix display, a cathode ray tube (CRT) display, a plasma display, a liquid crystal display (LCD), and the like. Although not depicted in FIG. 1, in some implementations the arcade machine 102 is configured to include one or more speakers that audibly output information to the user 104. In some implementations the one or more speakers are integrated as part of the display 106. In some implementations where the arcade machine 102 is configured as a pinball machine, at least a portion of the display 106 may be referred to as the "backglass" of the pinball machine. In some implementations, at least a portion of the display 106 is integrated as part of the playfield 108.

The playfield 108 is representative of a surface of the arcade machine 102 that includes components configured to facilitate gameplay for the arcade machine 102. For instance, when implemented as a pinball machine, the playfield 108 is configured to include at least one of a plunger to begin gameplay by launching a ball and one or more flippers configured to mechanically redirect the ball about the playfield based on input to the arcade machine in response to input at controls (e.g., buttons) by the user 104. Alternatively or additionally, the playfield 108 is configured to include one or more bumpers configured to propel the ball away from the bumper upon contacting the bumper.

Alternatively or additionally, the playfield 108 is configured to include one or more kickers or slingshots, such as rubber pads that detect impact of a ball and activate a switch to apply force to the rubber pad that propels the ball away from the slingshot or kicker upon impact. Alternatively or additionally, the playfield 108 is configured to include one or more targets that detect impact of the ball. For instance, the playfield 108 may include one or more banks of drop targets, where each drop target in a bank recedes below a surface of the playfield 108 when contacted by a ball and remain receded until all drop targets in the bank have been contacted by the ball before again protruding above the surface of the playfield 108.

In some implementations, the playfield 108 includes one or more portions configured to capture and retain a ball for a specified duration. For instance, the one or more portions configured to capture and retain a ball may be configured as holes, scoops, saucers, and the like, where the ball is returned to the playfield either from the portion in which the ball was captured or from another portion of the playfield 108 (e.g., from another hole linked via a tube below the playfield 108 to a hole in which the ball was captured during gameplay).

Alternatively or additionally, the playfield 108 includes one or more switches, which are each configured to block off an area of the playfield 108 after the ball passes through the switch. Alternatively or additionally, the playfield 108 includes one or more gates, which each permit the ball to pass through in one direction and prevent the ball from passing through in an opposite direction. Alternatively or additionally, the playfield 108 includes one or more posts that deflect a ball upon impact.

In some implementations, the playfield 108 includes one or more ramps that are configured as inclined planes that enable a ball to travel away from a primary surface of the playfield. Alternatively or additionally, the playfield 108 includes one or more sensors that each detect when a ball passes over a corresponding portion of a surface of the playfield 108. For instance, in some implementations a sensor is configured as a mechanical rollover target that is spring-loaded to detect when a ball passes over the sensor. In other implementations, a sensor is configured as an electromagnetic sensor that implements magnets to determine when a ball passes over the sensor. In certain configurations, electromagnetic sensors are configured to temporarily capture or alter a trajectory of a ball (e.g., by applying magnetic force to the ball).

Figure 3:
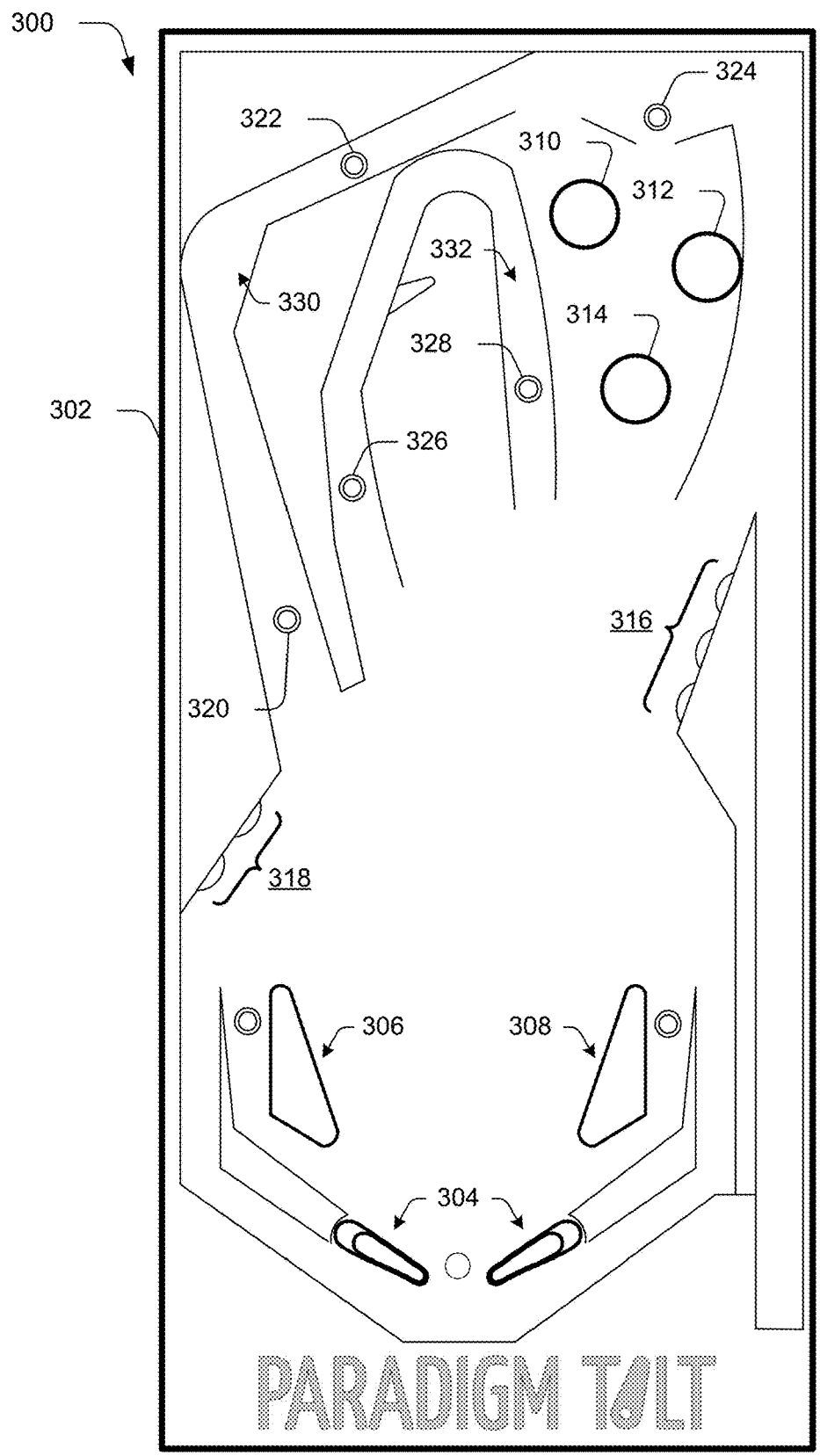
FIG. 3 depicts an example arcade machine playfield.

In accordance with one or more implementations the playfield 108 includes one or more lights, speakers, and other components that are activated in response to detecting a gameplay event or series of gameplay events at the playfield. Activation of such lights, speakers, and other event-activated components are dictated by a set of rules defined by a developer of the arcade machine 102 and codified in a rulebook governing gameplay at the arcade machine 102. An example configuration of the playfield 108 for a pinball implementation of the arcade machine 102 is illustrated in FIG. 3 and described in further detail below.

The sniffer 110 is representative of functionality of the arcade machine 102 to detect one or more events occurring with respect to the playfield 108 during gameplay at the arcade machine 102. In some implementations, the sniffer 110 is configured as a computer-readable storage medium storing instructions that identify occurrence of events during gameplay at the arcade machine 102, such as individual events triggered by a ball contacting an element included in the playfield 108 (e.g., hitting a bumper, being detected by a sensor, and so forth).

For instance, the sniffer 110 is implemented as integrated functionality of the arcade machine 102, such as a set of computer-readable instructions that cause one or more processors of the arcade machine 102 to output data describing events triggered during gameplay. Alternatively, the sniffer 110 is representative of a device (e.g., a combination of computer-readable storage media and at least one processor) retrofitted into the arcade machine 102 to output data describing events triggered during gameplay. The sniffer 110 is thus representative of functionality configured to detect events occurring during gameplay at the arcade machine 102 from a variety of sources, such as data describing outputs by the display 106, data describing signals transmitted by one or more components of the playfield 108, data stored in memory of the arcade machine 102, and so forth.

As described in further detail below, events detected by the sniffer 110 during gameplay at the arcade machine 102 refer to any manner of user inputs at the arcade machine 102 (e.g., coin inputs, control activations, etc.), events occurring with respect to the playfield 108 (e.g., activation of triggers specified by rules for advancing states associated with gameplay modes), and so forth. The gameplay events detected by the sniffer 110 are thus representative of a log of events that collectively describe a player's experience with the arcade machine 102 for a given gameplay session.

The hashing system 112 is representative of functionality of the arcade machine 102 to generate a machine-readable code that includes information describing events detected by the sniffer 110 during a gameplay session. For instance, the hashing system 112 is configured to aggregate gameplay events detected by the sniffer 110, organize and/or prioritize the events based on a rulebook that describes the rules (e.g., gameplay mechanics) currently implemented by the arcade machine 102, and generate a code unique to the gameplay session during which the gameplay events occurred. Functionality of the hashing system 112 is described in further detail below with respect to FIG. 2.

The strategy system 114 is representative of functionality of the arcade machine 102 to generate a strategy guide 116 for the user 104 based on the sequence of gameplay events detected by the sniffer 110 for a gameplay session at the arcade machine 102. In some implementations, the strategy guide 116 includes information describing a scoring summary for, and an overall duration of, the gameplay session. In some implementations, rules governing gameplay mechanics of the arcade machine 102 are described by a rulebook that includes descriptions for various gameplay modes (e.g., associated states, scoring parameters, storyline descriptions, corresponding playfield events, and so forth). Utilizing rulebook descriptions, the scoring summary included in the strategy guide 116 is broken down into sections and descriptions for various gameplay modes. Gameplay mode descriptions are configured to include information such as a breakdown of scores achieved in association with various mode states, a description regarding rules associated with the mode, a storyline associated with the mode, a recommendation regarding further advancement in the mode, combinations thereof, and so forth. In some implementations, gameplay mode descriptions may include multimedia content (e.g., video clips demonstrating how to play the mode, images displayed by the arcade machine 102 while the mode is active, and so forth).

The strategy system 114 is configured to generate the strategy guide 116 using a game-specific hash 118 generated by the hashing system 112. The game-specific hash 118 is representative of the machine-readable code that includes information describing the events detected by the sniffer 110 during a gameplay session. Receipt of the game-specific hash 118 by the strategy system 114 is dependent on a computing device implementing the strategy system 114. For instance, in scenarios where the strategy system 114 is implemented at the arcade machine 102, the hashing system 112 directly communicates the game-specific hash 118 to the strategy system 114 (e.g., via a data bus or other communication mechanism connecting the hashing system 112 and the strategy system 114).

In scenarios where the strategy system 114 is implemented as part of the arcade machine 102, the strategy system 114 is configured to encode the strategy guide 116 into machine-readable code 120 (e.g., a QR code) and output the machine-readable code 120 via display 106 of the arcade machine 102. The machine-readable code 120 is representative of a uniform resource locator (URL) that specifies an address for accessing information generated by the hashing system 112 and/or the strategy system 114. For instance, in some implementations the machine-readable code 120 includes a URL that specifies an address for accessing the strategy guide 116 via a web browser. By displaying the machine-readable code 120 at the display 106 of the arcade machine 102, implementing the strategy system 114 in the arcade machine 102 enables a user device 122 disposed with the user 104 to access the strategy guide 116. For instance, using a camera 124 of the user device 122, the user 104 captures the machine-readable code 120 and accesses the strategy guide 116 via a web browser of computing device application.

In some implementations, the machine-readable code 120 is configured to facilitate identification of the user 104 to one or more of the hashing system 112 or the strategy system 114. For instance, in response to being captured by the user device 122, the machine-readable code 120 is configured to cause display of a prompt at a user interface of the user device 122 for permitting transfer of user credentials from the user device 122 to the hashing system 112 and/or the strategy system 114. In some implementations, the prompt is presented as an interface to log into a user account, where successfully logging into the user account causes transfer of a user identifier (e.g., a username) to the hashing system 112 or the strategy system 114. Alternatively or additionally, in response to detecting user input at the prompt consenting to sharing a user identifier, the user device 122 is configured to transmit data specific to the user device 122 useable by the hashing system 112 or the strategy system 114 to identify the user 104 (e.g., a device identifier).

In some implementations, the hashing system 112 and/or the strategy system 114 is configured to identify the user 104 via input to the arcade machine 102. For instance, the arcade machine 102 may be configured with a scanner to detect a machine-readable identifier (e.g., a barcode) of a player pass registered to the user 104. Alternatively or additionally, the arcade machine 102 may be configured with an input device that enables the user 104 to sign-in to the arcade machine 102 directly using a username, user identifier number, etc. In implementations where the user 104 does not consent to sharing information or is a brand-new user of the arcade machine 102, the hashing system 112 and the strategy system 114 are configured to perform their respective functionality independent of information identifying the user 104.

The user device 122 is configurable in a variety of manners. The user device 122, for instance, is configurable as a desktop computer, a laptop computer, a mobile device (e.g., assuming a handheld or wearable configuration such as a tablet, mobile phone, smartwatch, etc.) as illustrated as being held by the user 104 in the illustrated example of FIG. 1, and so forth. Thus, the user device 122 ranges from full resource devices with substantial memory and processor resources (e.g., personal computers, game consoles) to low-resource devices with limited memory and/or processing resources (e.g., mobile devices).

Alternatively, in some implementations the arcade machine 102 is configured to directly transfer the strategy guide 116 to the user device 122 in response to the user device 122 capturing the machine-readable code 120. For instance, the machine-readable code 120 may be configured to cause the user device 122 to establish communication with the arcade machine 102 over which the strategy guide 116 is directly communicated to the machine-readable code 120. For instance, the machine-readable code 120 may be configured to establish a near-field communication between the arcade machine 102 and the user device 122, such as a Bluetooth connection. Alternatively or additionally, the machine-readable code 120 may be configured to include information that causes the user device 122 to establish a connection with the arcade machine 102 over a wireless network, such as network 126, and receive the strategy guide 116 via the network 126.

In other implementations, the strategy system 114 is implemented by a computing device other than the arcade machine 102. For instance, in some implementations, the strategy system 114 is implemented at the user device 122 (e.g., as an application installed on the user device 122). In other implementations, the strategy system 114 is implemented at a computing device remote from both the arcade machine 102 and the user device 122, such as at database 128. Additionally, although a single database 128 is shown, the database 128 is representative of a plurality of different devices, such as multiple servers utilized to perform operations "over the cloud," as described in further detail below with respect to FIG. 10.

In implementations where the strategy system 114 is implemented remotely from the arcade machine 102 (e.g., at the user device 122 or the database 128), the hashing system 112 is configured to output the game-specific hash 118 as the machine-readable code 120. In an example scenario where the machine-readable code 120 includes information describing the game-specific hash 118, the user device 122 is configured to capture the machine-readable code 120 using the camera 124 and transmit the game-specific hash 118 to the strategy system 114, implemented either locally at the user device 122 or remotely at the database 128. The strategy system 114 then generates the strategy guide 116 from the game-specific hash 118. Functionality of the strategy system 114 to generate the strategy guide 116 is described in further detail below with respect to FIG. 5.

In accordance with the techniques described herein, the strategy guide 116 and the game-specific hash 118 are generated based on a rulebook that describes rules (e.g., gameplay mechanics) governing the arcade machine 102. To do so, the hashing system 112 and the strategy system 114 are each configured to store the rulebook for the arcade machine 102. As described herein, in addition to including data describing gameplay mechanics of the arcade machine 102, the rulebook refers to data that includes an appearance of the arcade machine (e.g., as perceived by the user 104), a storyline associated with the arcade machine 102, media (e.g., audio, images, videos, etc.) associated with the arcade machine 102, a layout of the playfield 108, and so forth. The rulebook is thus representative of data describing any suitable aspect of the arcade machine 102 and its associated gameplay. In some implementations, information included in a rulebook is authored by an entity associated with the arcade machine 102 (e.g., game rules officially published by an arcade machine manufacturer), by a player (e.g., user 104), by an entity associated with the hashing system 112 and/or the strategy system 114, combinations thereof, and so forth. In the illustrated example of FIG. 1, rulebook 130 represents one of a plurality of rulebooks stored at the database 128 describing the arcade machine 102. The hashing system 112 and the strategy system 114 are configured to monitor for updates to the rulebook associated with the arcade machine 102 and adapt the strategy guides 116 and game-specific hashes 118 accordingly. For instance, in an example scenario where an entity associated with the arcade machine 102 publishes updated rules to include a new gameplay mode, a rulebook 130 stored at the database 128 may be updated to reflect the updated rules.

In addition to storing one or more rulebooks 130 for the arcade machine 102 and being configured to execute the strategy system 114, the database 128 is representative of functionality to store user profile information, such as a user profile 132 for the user 104. The user profile 132 representative of information describing one or more past gameplay sessions by the user 104 at the arcade machine 102. For instance, in an implementation where the user 104 logs into, or otherwise consents to being identified at the arcade machine 102, the user profile 132 is configured to store each strategy guide 116 generated from previous gameplay sessions at the arcade machine 102 by the user 104. In some implementations, the machine-readable code 120 is configured to cause communication of the strategy guide 116 to the database 128 upon capture by the user device 122 for storage as part of the user profile 132. Information stored in the user profile 132 is representative of previous gameplay sessions by the user 104 at the arcade machine 102 as well as other arcade machines (e.g., different arcade machines associated with the same rulebook 130, different arcade machines associated with different rulebooks, combinations thereof, and so forth).

The strategy system 114 is further configured to leverage historical data for the user 104 in generating the strategy guide 116 for a particular gameplay session. For instance, the strategy system 114 is configured to identify information included in previous strategy guides 116 such as personal best scores, personal best gameplay durations, past mode and state achievements, and so forth, and include a comparative summary of past results and current gameplay session statistics in the strategy guide 116. The specific information conveyed in the strategy guide 116 is not only dependent on the rulebook 130 for the arcade machine 102, but also past data specific to the user 104. In this manner, two different users who have gameplay sessions with identical sequences of events at the same arcade machine 102 associated with the same rulebook 130 may be presented with different strategy guides 116, accounting for different experience levels, past gameplay metrics, and so forth.

In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are configured to be applied together and/or combined in different ways. Thus, individual functionality, features, and concepts described in relation to different example environments, devices, components, figures, and procedures herein are useable in any suitable combinations and are not limited to the combinations represented by the enumerated examples in this description.

Game-Specific Hash and Strategy Guide Generation

Figure 2:
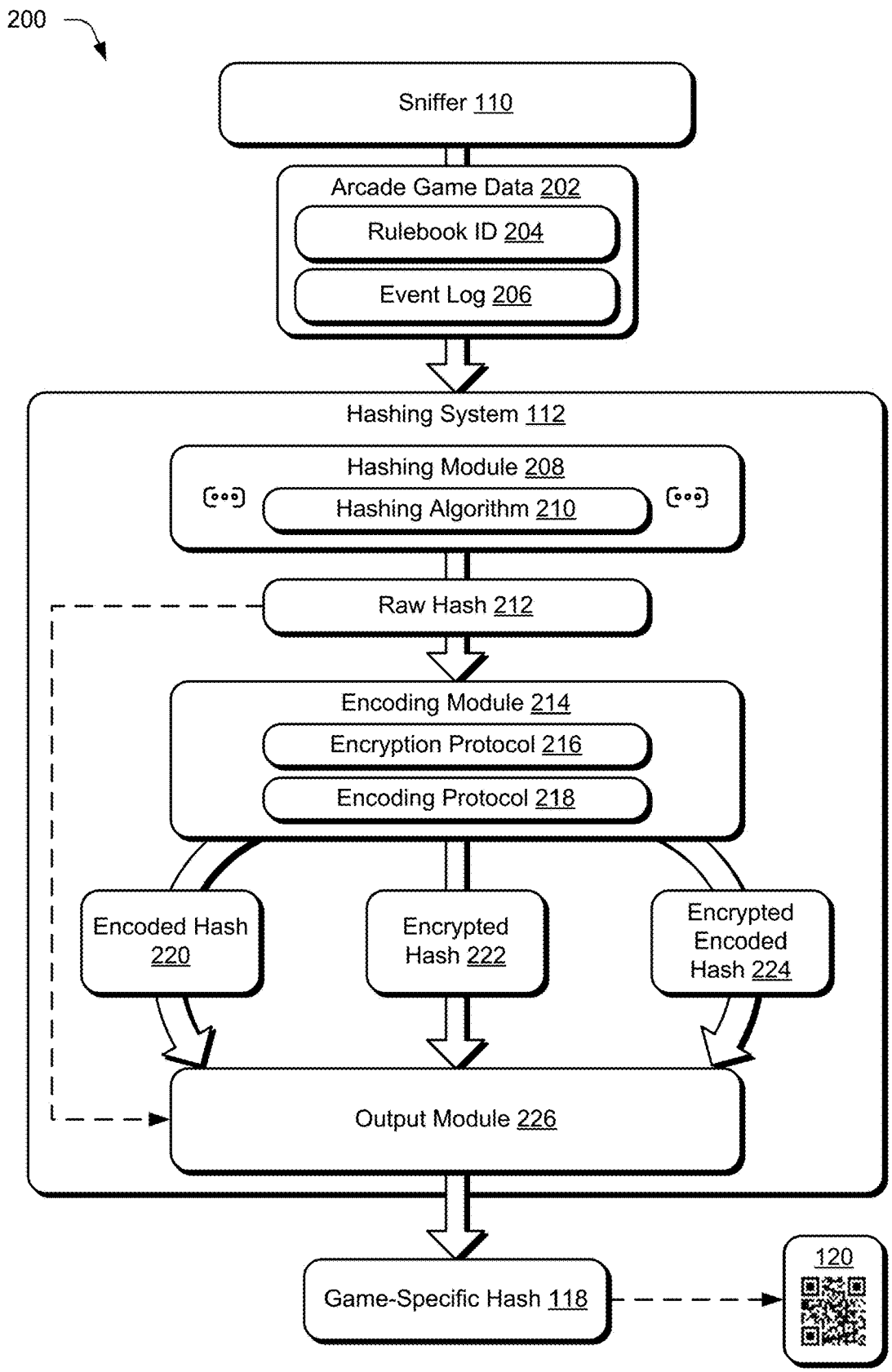
FIG. 2 depicts a system in an example implementation showing operation of a hashing system implemented by an arcade machine configured to generate a game-specific hash for use in generating a strategy guide.

FIG. 2 depicts a system 200 in an example implementation showing operation of the hashing system 112 as generating the game-specific hash 118 for use in generating a strategy guide 116 in greater detail.

FIG. 3 depicts an example 300 of a playfield 108 for the arcade machine 102.

Figure 4:
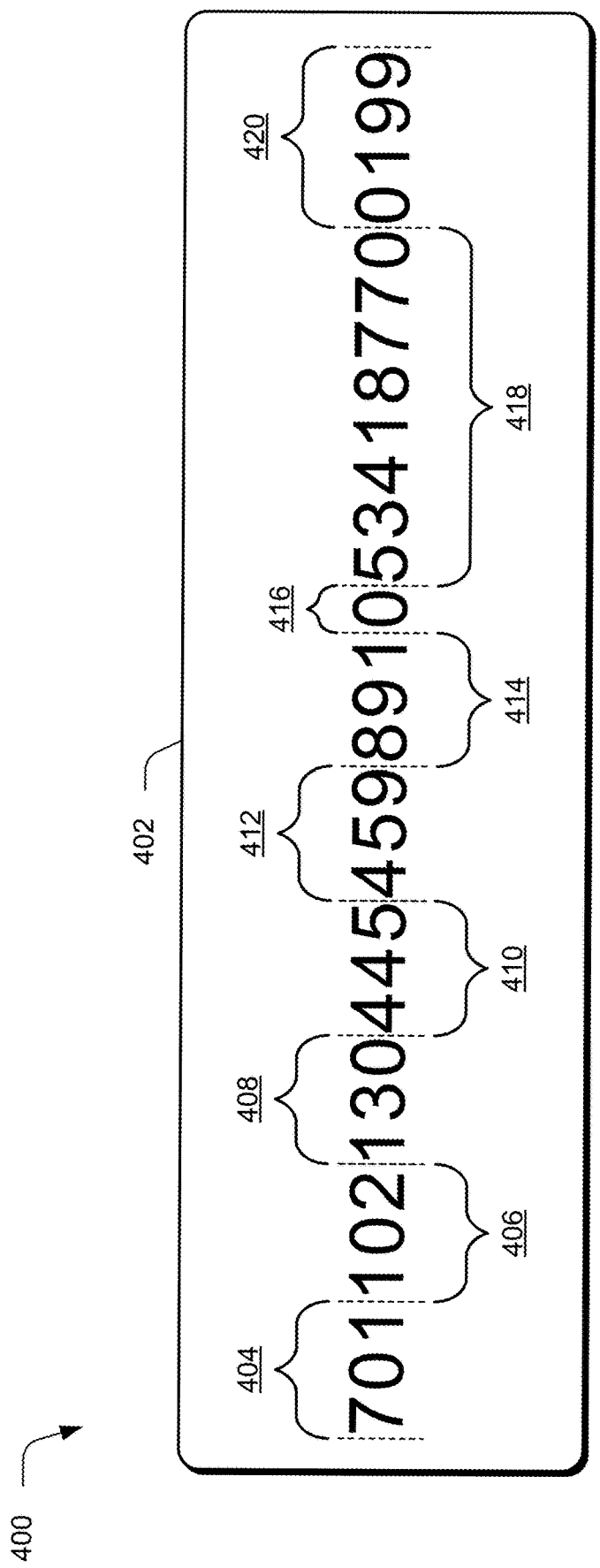
FIG. 4 depicts an example of a game-specific hash generated in accordance with the techniques described herein.

FIG. 4 depicts an example 400 of a game-specific hash 118 generated in accordance with the techniques described herein.

Figure 5:
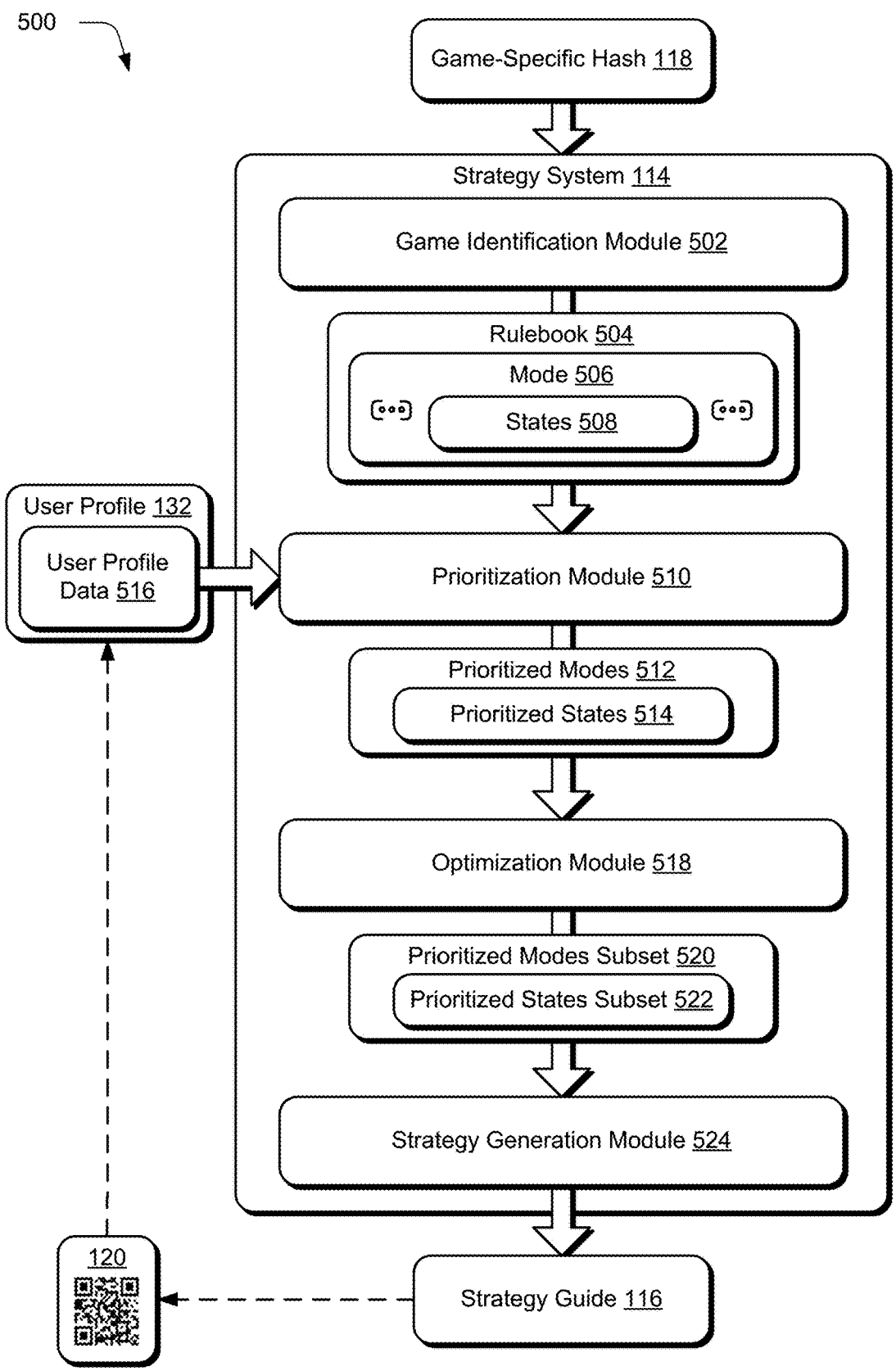
FIG. 5 depicts a system in an example implementation showing operation of a strategy system configured to generate a strategy guide based on a game-specific hash.

FIG. 5 depicts a system 500 in an example implementation showing operation of the strategy system 114 as generating a strategy guide 116 based on a game-specific hash 118.

FIG. 6 depicts an example 600 including code describing modes and states associated with gameplay for the arcade machine 102.

Figure 7:
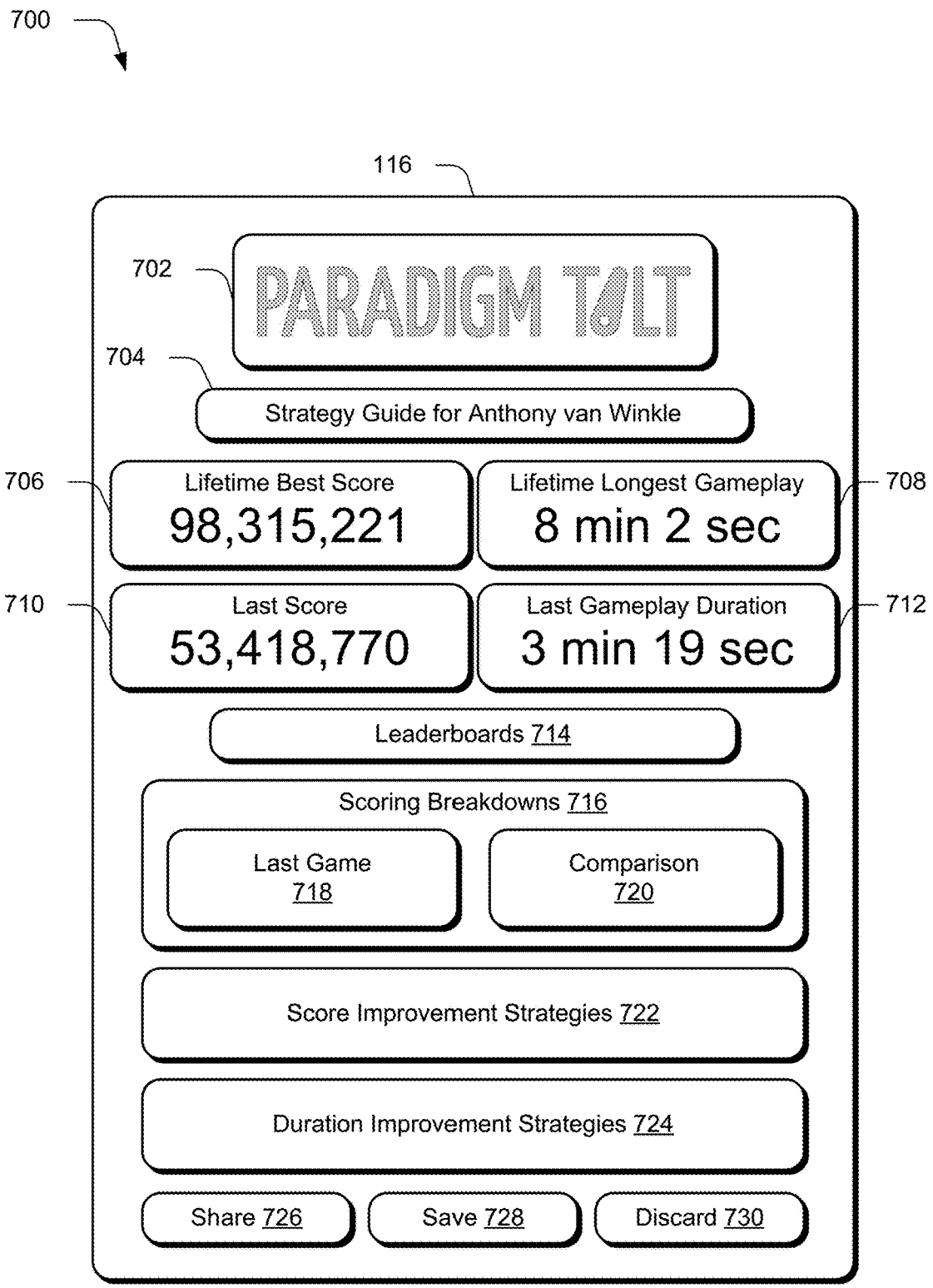
FIG. 7 depicts an example of a strategy guide generated using the techniques described herein.

FIG. 7 depicts an example 700 of a strategy guide 116 generated by the strategy system 114 using techniques described herein.

As illustrated in FIG. 2, the hashing system 112 is depicted as receiving arcade game data 202 from the sniffer 110, as integrated into the arcade machine 102 depicted in FIG. 1. The arcade game data 202 includes information specifying a rulebook identifier 204 as well as an event log 206 for a gameplay session at the arcade machine 102. The rulebook identifier 204 is representative of data indicating a rulebook 130 associated with the arcade machine 102. The event log 206 is representative of data describing one or more events that occurred relative to a display 106, a playfield 108, or combinations thereof during the course of the gameplay session. For instance, consider an example event log 206 generated during the course of a gameplay session at arcade machine 102 configured using the example playfield 302 illustrated in FIG. 3.

As depicted in FIG. 3, playfield 302 represents an example pinball layout for the arcade machine 102, which includes flippers 304 configured to propel a pinball about the playfield 302. The playfield 302 further includes a left kicker 306 and a right kicker 308, which are each configured to detect impact of a pinball and apply force propelling the pinball away from the respective kicker responsive to detecting impact, generally perpendicular from a face of the kicker. The playfield 302 further includes bumpers 310, 312, and 314. In an example implementation, each of the bumpers 310, 312, and 314 are configured as pop bumpers that include a skirt disposed underneath a cap of the bumper. The skirt is connected to a solenoid that causes the cap of the bumper to clamp down upon detecting the pinball rolling over the skirt, which causes the pinball to shoot away from the bumper at pseudo-random direction.

The playfield 302 further includes a plurality of targets, such as target bank 316 and target bank 318, where each of the target banks 316 and 318 include a plurality of individual targets. In some implementations, each of the target banks 316 and 318 are configured as including drop targets, such that individual targets in the target bank drop below a surface of the playfield 302 upon contact by the pinball and remain receded until all individual targets of the bank have been struck by the pinball. Dropping all targets in the target bank causes targets to again raise above the surface of the playfield 302. The playfield 302 is further depicted as including a plurality of sensors, such as sensors 320, 322, 324, 326, and 328. Each of the sensors 320, 322, 324, 326, and 328 is representative of functionality of the arcade machine 102 to detect when the pinball passes over a corresponding surface of the playfield 302. Further, the playfield 302 is illustrated as including ramp 330 and ramp 332, which are each inclined planes that enable a ball to travel away from a primary surface of the playfield along a path defined by the respective ramp.

The event log 206 included in the arcade game data 202 is representative of information describing a series of events that occur during a gameplay session with respect to both the arcade machine 102 and the playfield 108. For instance, the event log 206 includes information describing interactions between the user 104 and the arcade machine 102, such as a number of inputs at controls activating the flippers 304 or a force applied to a plunger to launch a pinball into the playfield 302. An additional example of information included in the event log 206 includes data describing a force applied by the user 104 against a frame of the arcade machine 102 to bias motion of a pinball about the playfield 302, inadvertently cause a "tilt" during gameplay, and so forth.

Data describing events occurring during a gameplay session with respect to the playfield 108 include a log of sequential events that occurred during gameplay with respect to various components of the playfield 108, along with corresponding scores (e.g., as output by the display 106 during gameplay). In some implementations, the sniffer 110 is configured to correlate the sequential events and their associated scores to identify a corresponding rulebook 130 for the arcade machine 102, represented by the rulebook identifier 204. Alternatively, in some implementations the rulebook identifier 204 is not explicitly set forth in the arcade game data 202 and the hashing system 112 is configured to ascertain the rulebook identifier 204 by analyzing data included in the event log 206 to identify a rulebook 130 that defines the scoring for a given event or sequence of events. For instance, in an example gameplay scenario at playfield 302, the event log 206 may identify that a pinball first passed sensor 324 before contacting bumper 312 and being ricocheted among bumpers 310, 312, and 314, such that the event log describes a precise sequence at which the pinball contacted each of the bumpers 310, 312, and 314 and a score associated with each one of the events.

Continuing the example gameplay scenario at playfield 302, the event log 206 may specify that the pinball was propelled by bumper 314 to strike a target included in target bank 316 before bouncing in between the left kicker 306 and the right kicker 308 being struck by a right one of the flippers 304. The event log 206 may describe that the right flipper 304 caused the pinball to travel the ramp 330 (e.g., as indicated by the pinball sequentially being detected by sensors 320 and 322). Other example events described by the event log 206 may indicate that the pinball traveled a portion, but not an entirety, of the ramp 332 (e.g., as indicated by the pinball being detected by only one of the sensors 326 or 328), a number of times, that the pinball dropped all targets included in one of the target banks 316 or 318, and so forth.

Additionally, the event log 206 is configured to include information describing information output by the arcade machine 102 during a gameplay session. For instance, the event log 206 may include data describing lights illuminated on the playfield 108 and/or the display 106, sounds output by the arcade machine 102, images and/or videos displayed at the display 106, and so forth, during playback at a given time during the gameplay session. Each event included in the event log 206 may be associated with a timestamp and a corresponding score value as defined by a rulebook implemented by the arcade machine 102. Consequently, the event log 206 includes information describing an overall sequence of events for a given gameplay session at the arcade machine 102.

Although described herein in the context of being generated for a pinball configuration with the playfield 302, the event log 206 is representative of information for any configuration of arcade machine 102 that comprehensively describes a gameplay session at the arcade machine 102, and is not limited to the examples described herein.

The arcade game data 202 is obtained from the sniffer 110 by the hashing system 112 and passed to a hashing module 208. The hashing module 208 is representative of functionality of the hashing system 112 to implement a hashing algorithm 210 and generate a raw hash 212 from the arcade game data 202. In implementations, the hashing system 112 is configured to store a plurality of hashing algorithms 210 and select a particular hashing algorithm 210 based on the arcade machine 102 at which the hashing system 112 is implemented.

For instance, in some implementations, the hashing algorithm 210 is representative of a low-density hashing algorithm that is selected for older arcade machines 102 having a low-resolution display 106, which limits an amount of information that can be embedded in the machine-readable code 120. A low-density instance of the hashing algorithm 210 may alternatively or additionally be selected by the hashing module 208 in implementations where the arcade machine 102 has a restricted data transfer capability (e.g., low bandwidth) for communicating the game-specific hash 118 to the strategy system 114.

In some implementations, the hashing algorithm 210 is representative of a high-density hashing algorithm that is selected for newer arcade machines 102 having a high-resolution display 106, which is not limiting as to an amount of information that can be embedded in the machine-readable code 120. A high-density instance of the hashing algorithm 210 may alternatively or additionally be selected by hashing module 208 in implementations where the arcade machine 102 is configured with a high bandwidth transfer protocol for communicating the game-specific hash 118 to the strategy system 114 (e.g., direct connection to the Internet via network 126, near field communication connection to user device 122 via Bluetooth or Wi-Fi, combinations thereof, and so forth).

In some implementations, the hashing algorithm 210 is selected by the hashing module 208 based on the rulebook identifier 204. For instance, the hashing module 208 is configured to select a hashing algorithm 210 having high state precision when generating a game-specific hash 118 for an arcade machine 102 associated with a rulebook 130 that includes few modes but many variations and rules for each of the few modes. Alternatively, the hashing module 208 is configured to select a hashing algorithm 210 having high mode precision for an arcade machine 102 associated with a rulebook 130 that includes many modes and a limited number of state variations associated with each mode. Thus, the specific hashing algorithm 210 implemented by the hashing module 208 is dependent on the arcade machine 102 implementing the hashing system 112 as well as a rulebook 130 describing gameplay mechanics of the arcade machine 102.

Using the hashing algorithm 210, the hashing module 208 generates the raw hash 212 from the arcade game data 202. The raw hash 212 is representative of a data string that describes the rulebook 130 implemented by the arcade machine 102 for a gameplay session, a plurality of game modes associated with the rulebook 130, and a state achieved for each of the plurality of modes during the gameplay session. In this manner, the raw hash 212 is configured to include any information describing a gameplay session at the arcade machine 102, such as a number of balls played during a turn, a number of turns, a cost of the game, a number of extra balls awarded, a number of tilt warnings, a timing of a tilt warning, and so forth. In some implementations, the raw hash 212 includes information describing an overall score resulting from the gameplay session as well as a duration of the gameplay session.

In the illustrated example of FIG. 4, hash 402 is representative of a raw hash 212 generated from arcade game data 202 using a low-density hashing algorithm 210 having high mode precision in accordance with one or more implementations. For purposes of simplicity, hash 402 is illustrated as a strictly numeric hash configured to represent up to 90 game modes and up to 10 states per mode for a rulebook 130. In implementations, the hashing module 208 is configured to select a low-density hashing algorithm 210 for generating the hash 402 when the arcade machine 102 is configured with a restricted resolution display 106, such as a dot-matrix display configured to display a QR code instance of the machine-readable code 120.

The hash 402 includes a plurality of portions 404, 406, 408, 410, 412, 414, 416, 418, and 420. Each portion of the hash 402 is representative of different information regarding a gameplay session at the arcade machine 102. Portion 404, for instance, includes a three-digit identifier "701" that designates the rulebook 130 associated with the arcade machine 102. In an example implementation, the first two digits "70" indicate a game to which the rulebook 130 pertains and the third digit "1" indicates a revision of the rulebook 130.

Portions 406, 408, 410, 412, and 414 each include three-digit identifiers that are individually useable to describe a gameplay mode and a state achieved for the corresponding gameplay mode during the gameplay session. For instance, the first two digits specify a gameplay mode to which the hash 402 portion pertains, such that portion 406 pertains to mode 10, portion 408 pertains to mode 13, portion 410 pertains to mode 44, portion 412 pertains to mode 45, and portion 414 pertains to mode 89. The third digit in portions 406, 408, 410, 412, and 414 designates a state achieved with respect to the corresponding mode during the gameplay session. For instance, portion 404 indicates that state 2 was achieved for mode 10, portion 408 indicates that no states were achieved for mode 13, portion 410 indicates that state 5 was achieved for mode 44, portion 412 indicates that state 9 was achieved for mode 45, and portion 414 indicates that state 1 was achieved for mode 89.

In some implementations, the modes and respective states represented by portions 406, 408, 410, 412, and 414 are ordered in the raw hash 212 based on priority. Alternatively or additionally, the hashing module 208 is configured to selectively include only a subset of overall modes and their respective states in the raw hash 212 to reduce an amount of mode and state combinations described by the raw hash 212. Mode prioritization and subset selection thereof is described in further detail below with respect to FIG. 5. Although described in detail as being performed by the strategy system 114 for use in generating a strategy guide 116, operations described as being performed by the strategy system 114 are equally performable by the hashing module 208 to prioritize game modes and associated states as represented in the raw hash 212. Similarly, operations described below as being performed by the strategy system 114 are equally performable by the hashing module 208 to select a subset of game modes and associated states as being represented in the raw hash 212.

Portion 416 is a placeholder value indicating an end of data in the hash 402 representing mode states achieved during gameplay at the arcade machine 102. Portion 418 indicates a score achieved during gameplay at the arcade machine 102. For instance, the hash 402 indicates that the user's 104 score for a gameplay session at the arcade machine 102 was 53,418,770. Finally, portion 420 indicates a duration of the gameplay session (e.g., 199 seconds).

Thus, the hash 402 is an example of a raw hash 212 generated by the hashing module 208 from arcade game data 202 that represents a gameplay session at the arcade machine 102 in a single data string. Although illustrated in FIG. 4 and described with respect to being a strictly numeric hash, the raw hash 212 is not so limited. For instance, in some implementations the raw hash 212 is output as a hexadecimal hash generated by a medium-density hashing algorithm 210. Such a hexadecimal raw hash 212 is capable of storing information for up to 248 modes and up to 16 states per mode. Alternatively, in some implementations the raw hash 212 is output as an alphanumeric hash generated by a high-density hashing algorithm 210. Such an alphanumeric raw hash 212 is capable of storing information for up to thousands of mode/and or states describing gameplay at the arcade machine 102.

The hashing system 112 further includes an encoding module 214, which is configured to leverage one or more of an encryption protocol 216 or an encoding protocol 218. The encryption protocol 216 is representative of functionality of the hashing system 112 to encrypt the raw hash 212 using a secret key, such that knowledge of the secret key is required to unencrypt data included in the raw hash 212. The encoding protocol 218 is representative of functionality of the hashing system 112 to encode (e.g., reduce in size) the raw hash 212.

In this manner, the encoding module 214 is configured to generate an encoded hash 220 by processing the raw hash 212 using the encoding protocol 218. The encoded hash 220 is thus representative of an instance of the raw hash 212 having a higher density of information for a same number of characters included in the data string of the raw hash 212, although not secure from decoding and/or modification. Alternatively or additionally, the encoding module 214 is configured to generate an encrypted hash 222 by processing the raw hash 212 using the encryption protocol 216. The encrypted hash 222 is thus representative of an instance of the raw hash 212 that has been signed with a secret key, such as a secret key specific to the combination of the arcade machine 102 and/or the rulebook 130, where knowledge of the secret key is required to decrypt information included in the encrypted hash 222. The encrypted hash 222 thus prevents tampering of information otherwise represented by the raw hash 212, as altering any digit of the encrypted hash 222 will cause validation failure when decrypted using the secret key.

In some implementations, the encoding module 214 is configured to process the raw hash 212 using both the encryption protocol 216 and the encoding protocol 218 to generate an encrypted encoded hash 224. The encrypted encoded hash is representative of an instance of the raw hash 212 that has been both encoded by the encoding protocol 218 and encrypted by the encryption protocol 216. The encoding module 214 is configured to selectively process the raw hash 212 using one or more of the encryption protocol 216 or the encoding protocol 218, as well as a specific type of the encryption protocol 216 or the encoding protocol 218, based on various considerations. For example, the encoding protocol 218 is representative of any suitable encoding protocol, such as base32, base64, and so forth. The encryption protocol 216 is representative of any suitable encryption protocol, such as electronic codebook (ECB), cipher block chaining (CBC), message-digest (e.g., MD5), secure hash (e.g., SHA), and so forth. For instance, whether to use the encryption protocol 216 or the encoding protocol 218 is dependent on a capability of the arcade machine 102 to transfer data, such as a data communication mechanism available to the arcade machine 102, a communication bandwidth of the arcade machine 102, and so forth.

An output of the encoding module 214 (e.g., one or more of the encoded hash 220, the encrypted hash 222, or the encrypted encoded hash 224) is then provided to an output module 226. The output module 226 is configured to output data received from the encoding module 214 as a game-specific hash 118. Alternatively, in some implementations, the hashing system 112 avoids encrypting or encoding of the raw hash 212, as indicated by the dashed line circumventing the encoding module 214. In implementations where the raw hash 212 is neither encrypted nor decoded, the output module 226 is configured to output the raw hash 212 as the game-specific hash 118. The output module 226 is configured to output the game-specific hash 118 in a variety of manners, such as directly (e.g., via data transfer bus) or indirectly (e.g., via display 106 as machine-readable code 120) to the strategy system 114 for use in generating a strategy guide 116.

Having considered example techniques for generating a game-specific hash 118, consider now example techniques for generating a strategy guide 116 from the game-specific hash 118.

As illustrated in FIG. 5, the strategy system 114 receives the game-specific hash 118 (e.g., via direct communication from the arcade machine 102 or via the user device 122). The hashing system 112 is depicted as including a game identification module 502. The game identification module 502 is representative of functionality of the strategy system 114 to identify a rulebook 504 describing gameplay mechanics of the arcade machine 102 for which the game-specific hash 118 was generated (e.g., a rulebook 130 as specified by portion 404 of the game-specific hash 118). The game identification module 502 is further configured to identify a plurality of gameplay modes 506 defined by the rulebook 504 as well as one or more states 508 associated with each of the modes 506.

As described herein, each mode 506 refers to a game mechanic that can be measured quantitatively during gameplay at the arcade machine 102. Examples of modes 506 include a mission, a collectible, an achievement, a progression, a counter, combinations thereof, and so forth. Each mode 506 is defined by one or more states 508 that the mode can currently be in during gameplay. As the user 104 engages with game mechanics during gameplay at the arcade machine 102, various triggers cause transitions between different states 508 for a given mode 506.

Using the playfield 302 illustrated in FIG. 3 as an example, the rulebook 504 may describe how for a first mode, a first state is activated when a pinball successfully "drops" all individual targets of the target bank 316. The rulebook 504 may further specify that for the first mode, the second state is active when the pinball successfully completes two "ramp shots" on ramp 330 (e.g., activates both sensors 320 and 322) while in the first state for the first mode. In this manner, the respective modes 506 and states 508 described by a rulebook 504 collectively outline a gameplay experience for the arcade machine 102.

In implementations, each of the modes 506 and its associated one or more states 508 is associated with a description in the rulebook 504. The description for a given mode or state can be authored to include a range of information, such as a description of how the mode or state pertains to an overall story progressed by gameplay at the arcade machine 102, gameplay instructions, strategy tips, and so forth. The rulebook 504 is further configured to describe the rules governing operation of the arcade machine 102 for each mode and state combination when active. For instance, each mode 506 and/or state 508 may be associated with instructions describing lights to be activated in the playfield 108, images to be output at the display 106, sounds to the played, combinations thereof, and so forth.

For an example of code describing modes 506 and states 508 associated with an example rulebook 504 governing gameplay at the arcade machine 102, consider FIG. 6. The illustrated example of FIG. 6 includes code segment 602, which is representative of code governing gameplay and described by the rulebook 504 for one of the modes 506 and its associated one or more states 508. Specifically, code segment 602 notes that the first one of the modes 506 is associated with a key identifier of "15," and is named "Prepare for Launch." The code segment 602 further includes a summary for the mode that includes a textual description of how the mode pertains to an overall story for the game supported by arcade machine 102. The code segment 602 also includes a description for the mode representative of information to be output via the display 106 while the mode is active at the arcade machine 102.

Further, the code segment 602 includes instructions governing game mechanics for the arcade machine 102 when the first one of the modes 506 is active, such as displaying a "launchpad.png" image at the display 106 and illuminating one or more lights with an "0066FF" hex color code for a duration of 10 seconds, with a 10 second timer to be reset each time one or more designated events occur with respect to the playfield 108.

The code segment 602 additionally includes instructions defining how various one or more states 508 of the first one of the modes 506 are activated. Specifically, code segment 602 notes that "all drop targets" in the playfield 108 need to be hit during "ground-level gameplay" to unlock the first one of the modes 506 and transition from a corresponding state identifier of "0" to "1." Transitioning from the state identifier of "1" to "2" requires hitting five bumpers and selecting "Launch" from a mission select option. Transitioning from the state identifier of "2" to "3" requires hitting one ramp shot while gameplay is in the "2" state identifier for the first one of the modes 506, prior to the 10 second timer elapsing. Similarly, progressing from state identifier "3" to state identifier "4" requires hitting one ramp shot prior to expiration of the timer while gameplay is in the state identifier "3" for the first one of the modes 506. Finally, state identifier "9" indicates that completion of all states for the first one of the modes 506 is accomplished by hitting a ramp shot prior to expiration of the timer while gameplay is in the state identifier "4" for the first one of the modes 506.

In this manner, rulebook 504 data (e.g., information describing the modes 506 and associated one or more states 508) is useable to define a rich and complex experience during a gameplay session at the arcade machine 102. However, due to limited display capabilities, many configurations of the arcade machine 102 are unable to comprehensively output all information included in the rulebook 504. This problem is exacerbated for fast-paced games, as even arcade machines 102 having the most advanced display capabilities are unable to comprehensively output rulebook 504 information in a manner that is readily consumable by the user 104 during gameplay. Further, in many implementations the rulebook 504 includes information that is not configured for presentation or otherwise output to the user 104 during gameplay, thus depriving the user 104 of a complete gameplay experience at the arcade machine 102. To address these shortcomings, the strategy system 114 is configured to generate a strategy guide 116 that accounts for both the specific sequence of gameplay events described by the game-specific hash 118 and the specific rulebook 504 describing gameplay mechanics for the arcade machine 102.

In some implementations, the strategy system 114 stores the rulebook 504 locally in storage at a computing device implementing the strategy system 114 (e.g., locally at the user device 122). Alternatively, the strategy system 114 is configured to obtain the rulebook 504 from a remote storage location, such as via network 126 from database 128 upon identifying the rulebook 504 in the game-specific hash 118.

The game identification module 502 provides the game-specific hash 118 together with the rulebook 504 to a prioritization module 510. The prioritization module 510 is representative of functionality of the strategy system 114 to order the modes 506 and their associated one or more states 508 based on the user 104 for which the strategy guide 116 is generated. To do so, the prioritization module 510 considers various criteria, such as previous experience by the user 104 with a given mode 506, an importance or rarity of a given mode 506, a position of a given mode 506 relative to a storyline for gameplay at the arcade machine 102, combinations thereof, and so forth. The modes 506 and each of their one or more states 508 are reordered and output as prioritized modes 512.

In some implementations, the one or more states 508 for each of the modes 506 are reordered by priority and output as prioritized states 514 by the prioritization module 510. Alternatively or additionally, in some implementations the prioritization module 510 avoids prioritizing states associated with one of the prioritized modes 512. Alternatively or additionally, in some implementations the prioritization module 510 adjusts an order of the prioritized states 514 associated with one or more of the modes 506 without reordering the modes for output as the prioritized modes 512. Thus, the prioritized modes 512 and their associated prioritized states 514 are representative of any ordered combination of the modes 506 and each of their one or more states 508.

For instance, in some implementations the prioritization module 510 orders the prioritized modes 512 and/or the prioritized states 514 based on an importance of the associated modes 506 and/or one or more states 508 as specified by the rulebook 504. Importance may be derived from the rulebook 504 in any suitable manner, such as based on a relative position of the mode or state in the rulebook 504, based on an annotation in the rulebook 504, based on an associated point or scoring value in the rulebook 504, and so forth. For instance, in some implementations the prioritization module 510 identifies that modes 506 are numerically prioritized in the rulebook 504, such that mode 48 is more important than mode 12 and state 9 is more important than state 6, and so forth.

In some implementations, the prioritization module 510 prioritizes the prioritized modes 512 and/or the prioritized states 514 based on data included in the game-specific hash 118. For example, the prioritization module 510 may identify that two different modes 506 are associated with equal priorities as specified by the rulebook 504 and identify that the user 104 achieved a higher state 508 for a first one of the two different modes 506 than a second one of the two different modes 506. In this example, the prioritization module 510 may output the first one of the two different modes 506 as prioritized over the second one of the two different modes 506 in the prioritized modes 512 based on the higher associated state achievement described by the game-specific hash 118. Alternatively, in some implementations the prioritization module 510 prioritizes modes 506 having lower associated state achievements in the prioritized modes 512 (e.g., for generating a strategy guide 116 configured to facilitate game improvement strategies and emphasize gameplay deficiencies).

In some implementations, the prioritization module 510 is configured to replace one or more of the modes 506 with another one or more modes 506 in the prioritized modes 512. For instance, information in the rulebook 504 may specify that certain modes 506 are replacements or successors to other modes 506. As an example, one of the modes 506 may represent unlocking a special part of the gameplay experience and require a complex sequence of actions to unlock, where each of the complex sequence of actions are represented by the one or more states 508. In response to determining that the game-specific hash 118 indicates that the user 104 has successfully unlocked the special part of the gameplay represented by a different mode 506 with its own states 508, the prioritization module 510 may include the special part of the gameplay mode in the prioritized modes 512 in place of the mode representing the unlock sequence for the special part of the gameplay.

As another example, some of the modes 506 may be considered subsets for other modes, where the rulebook 504 indicates that a mode is only to be included if a hierarchical parent mode was in a particular state or states, as specified by the game-specific hash 118. For instance, a certain mode 506 may have a particularly difficult mechanic required to reach a certain state 508. The rulebook 504 may include information for this particularly difficult mechanic and designate that the certain mode 506 be described in the strategy guide 116 only if the game-specific hash 118 indicates that a specified subset of states 508 achieve or fail to achieve a threshold metric. In this manner, the prioritization module 510 is configured to selectively include a representation of some or all of the modes 506 and their associated one or more states 508 based on a specific rulebook 504 associated with the arcade machine 102 as well as based on a particular gameplay session, as specified by the game-specific hash 118.

Alternatively or additionally, the prioritization module 510 is configured to output the prioritized modes 512 and the prioritized states 514 based on user profile data 516. User profile data 516 is representative of historical information specified in at least one user profile 132, such as the user profiles stored by the database 128 illustrated in FIG. 1. For instance, in some implementations the user profile data 516 is representative of data associated with a specific user for which the game-specific hash 118 was generated (e.g., user 104). Alternatively or additionally, the user profile data 516 is representative of data associated with one or more users other than the user 104, such as historical data describing a group of users' gameplay metrics at the arcade machine 102, or other arcade machines associated with the rulebook 504.

By leveraging the user profile data 516, the prioritization module 510 is configured to output the prioritized modes 512 and/or the prioritized states 514 with an indication as to how a representation of modes 506 and their one or more states 508 included in the game-specific hash 118 compare to historical metrics for the user 104 and/or one or more different users. For instance, modes 506 may be prioritized based on past achievements (e.g., state 508 progressions) represented in user profile data 516, such that the corresponding prioritized mode 512 is output with an indication of how the gameplay session represented by the game-specific hash 118 compares to past gameplay sessions.

As an example, one or more of the prioritized modes 512 or the prioritized states 514 may be prioritized in a user-specific manner, such as prioritizing modes 506 and/or states 508 to emphasize personal best achievements for the user 104. Alternatively or additionally, the prioritized modes 512 and prioritized states 514 may be output based on a comparison of data described in the game-specific hash 118 to global metrics for the arcade machine 102 (e.g., prioritized relative to achievement or scoring information tracked for a plurality of users at arcade machines associated with the rulebook 504).

As another example of leveraging user profile data 516, the prioritization module 510 may detect that the user 104 has achieved additional progress on one or more of the modes 506 or states 508 relative to past progress recorded in the user profile data 516 and select a different description for the one or more of the modes 506 or states 508 to be output as part of the prioritized modes 512 or prioritized states 514. In this manner, the prioritized modes 512 and the prioritized states 514 are representative of a bespoke representation of the modes 506 and their one or more states 508. This bespoke representation is tailored by the prioritization module 510 based on a specific rulebook 504 for which the game-specific hash 118 was generated, particular gameplay events described in the game-specific hash 118, historical user data for a user associated with the game-specific hash 118, user data for one or more different users, combinations thereof, and so forth.

The prioritized modes 512 and the prioritized states 514 are then communicated to an optimization module 518. The optimization module 518 is representative of functionality of the strategy system 114 to select a subset of the prioritized modes 512 and/or a subset of the prioritized states 514 for output as part of the strategy guide 116. The subset of the prioritized modes 512 is represented as prioritized modes subset 520, where the prioritized states 514 for each of the corresponding prioritized modes 512 is represented as the prioritized states subset 522 in the illustrated example of FIG. 5. In some implementations, each of the prioritized modes subset 520 and the prioritized states subset 522 represent proper subsets of the corresponding prioritized modes 512 and prioritized states 514, such that the prioritized modes subset 520 does not include an entirety of the corresponding prioritized modes 512 and the prioritized states subset 522 does not include an entirety of the corresponding prioritized states 514. Alternatively, in some implementations the prioritized modes subset 520 represents an entirety of the corresponding prioritized modes 512 and the prioritized states subset 522 represents an entirety of the corresponding prioritized states 514.

The optimization module 518 is configured to output the prioritized modes subset 520 and the prioritized states subset 522 based on a variety of considerations. For instance, in some implementations the prioritized modes subset 520 and prioritized states subset 522 are output based on a data transfer protocol bandwidth associated with a computing device implementing the strategy system 114. As an example, consider a scenario where the strategy system 114 is implemented at an arcade machine 102 having a low-bandwidth connection to the network 126. In this example, the low-bandwidth connection may preclude practically communicating a strategy guide 116 that describes an entirety of the prioritized modes 512 and the prioritized states 514. Accordingly, the optimization module 518 is configured to exclude a representation of at least one of the prioritized modes 512 or the prioritized states 514 from the prioritized modes subset 520 and the prioritized states subset 522.

Alternatively or additionally, the optimization module 518 is configured to output the prioritized modes subset 520 and the prioritized states subset 522 based on display capabilities of a device outputting machine-readable code 120 representing the strategy guide 116 or display capabilities of a device at which the strategy guide 116 is to be rendered. For instance, in an example implementation where the strategy guide 116 is to be represented as machine-readable code 120 via a display 106 of the arcade machine 102, the optimization module 518 may identify a that a resolution of the display 106 prevents encoding an entirety of the prioritized modes 512 and the prioritized states 514 in the machine-readable code 120 and selectively remove certain modes or states from being represented in the prioritized modes subset 520 and prioritized states subset 522. As another example, the optimization module 518 may determine that the strategy guide 116 is to be output on a mobile computing device having a limited display size relative to a desktop computing device and output the prioritized modes subset 520 and the prioritized states subset 522 to account for this limited display size.

In implementations, the user profile data 516 is configured to output the prioritized modes subset 520 and the prioritized states subset 522 based on associated priorities as designated by the prioritization module 510. For example, responsive to determining that an entirety of the prioritized modes 512 and prioritized states 514 are not to be represented in the strategy guide 116, the optimization module 518 may begin eliminating states and modes having lowest associated priorities until data encompassing the prioritized modes subset 520 and prioritized states subset 522 achieves a threshold size. This threshold size may be quantified based on embedding requirements for a data transfer mechanism for communicating the strategy guide 116, a machine-readable code 120 representing the strategy guide 116, device display capabilities, and so forth.

Although described herein with respect to the strategy system 114, as noted above, the techniques for prioritizing and selecting subsets of modes and/or states is similarly performable by the hashing system 112 in generating the game-specific hash 118.

The prioritized modes subset 520 and the prioritized states subset 522 are then communicated from the optimization module 518 to a strategy generation module 524. The strategy generation module 524 is representative of functionality of the strategy system 114 to output the strategy guide 116. In some implementations, the strategy guide 116 is output directly to one or more computing devices (e.g., directly from the strategy system 114 to the user device 122 and/or the database 128). Alternatively, in some implementations the strategy guide 116 is output to user profile 132 and a machine-readable code 120 is generated with a link (e.g., uniform resource locator) that includes an address for accessing the strategy guide 116 from the user profile 132. FIG. 7 illustrates an example strategy guide 116 generated using the techniques described herein.

As depicted in FIG. 7, the strategy guide 116 includes a title 702 that specifies a specific game for which the strategy guide 116 is generated. The strategy guide 116 further includes a user identifier 704 indicating an identity of the user 104 for which the strategy guide 116 is generated. The strategy guide 116 also includes one or more gameplay metrics for one or more gameplay sessions, such as a best score metric 706, a longest gameplay metric 708, a last score metric 710, and a last gameplay duration metric 712. For instance, the best score metric 706 may be representative of a best score achieved by the user 104 and the longest gameplay metric 708 may be representative of a longest gameplay duration achieved by the user 104 for gameplay sessions governed by the rulebook 504. The last score metric 710 and the last gameplay duration metric 712 may be representative of a gameplay score and duration indicated in the game-specific hash 118, respectively.

The strategy guide 116 may further include one or more leaderboards 714. Each of the one or more leaderboards 714 are representative of information describing a position of the gameplay score metrics for the particular user 104 relative to other user metrics for gameplay described by a same rulebook (e.g., rulebook 504). Individual ones of the one or more leaderboards 714 may be qualified according to various criteria, such as region (e.g., city, state, country, global, etc.), time (e.g., day, week, month, year, all time, etc.), and so forth. In this manner, the strategy guide 116 is configurable to provide comprehensive information describing a performance of the user 104 relative to other users.

The strategy guide 116 is further configurable to provide information describing one or more scoring breakdowns 716. The scoring breakdowns 716 may include information describing a last game breakdown 718, which is representative of information describing how the score and duration represented by the last score metric 710 and the last gameplay duration metric 712 were achieved. To generate the last game breakdown 718, the strategy generation module 524 is configured to compile information described by the prioritized modes subset 520 and the prioritized states subset 522, as derived from the game-specific hash 118. The last game breakdown 718 is thus representative of information describing one or more of a story, a progress summary, a description of associated rules, and the like for each of one or more of the modes 506 or the states 508 described in the rulebook 504 for the arcade machine 102.

In some implementations, the one or more scoring breakdowns 716 may include a comparison breakdown 720. The comparison breakdown 720 is representative of information that provides a comparative summary of two or more gameplay sessions for the arcade machine 102. For instance, the comparison breakdown 720 may include information describing a comparative summary of various mode and state similarities and differences associated with a most recent gameplay session for the user 104 and a lifetime best gameplay session for the user 104. Alternatively or additionally, the comparison breakdown 720 may include information describing a comparative summary for various mode and state similarities and differences between a past (e.g., most recent, lifetime best, etc.) gameplay session for the user 104 and a gameplay session for one or more different users, such as a gameplay session represented in the one or more leaderboards 714.

In some implementations, the strategy generation module 524 generates the strategy guide 116 to include one or more score improvement strategies 722. Individual ones of the score improvement strategies 722 are curated for a specific one of the modes 506, its associated states 508, or combinations thereof. For example, the score improvement strategies may identify that certain modes described in the game-specific hash 118 and/or prior gameplay data for the user 104 were almost completed and that achieving one or more states for the certain modes would achieve a scoring bonus. The strategy generation module 524 is thus configured to generate a summary and description of this scoring bonus for inclusion in the strategy guide 116. In some implementations, the strategy generation module is configured to customize one or more of the scoring breakdowns 716, score improvement strategies 722, or duration improvement strategies 724 to correlate with visual gameplay aspects of a gameplay session. For instance, with respect to the example code segment 602 depicted in FIG. 6, a scoring breakdown 716 for a "Prepare for Launch" mode may be output with the launchpad.png image and associated with (e.g., bordered by, etc.) the 0066FF hex color code in the strategy guide 116. In this manner, the strategy generation module 524 generates the strategy guide 116 to correlate with gameplay aspects experienced by the user 104 during gameplay at the arcade machine 102.

In a similar manner, the strategy generation module 524 is configured to generate the strategy guide 116 with one or more duration improvement strategies 724. The duration improvement strategies 724 are representative of information describing how a specific one of the modes 506, its associated states 508, or combinations thereof are useable to extend a gameplay session playback duration. For instance, the rulebook 504 may specify that certain modes 506, states 508, combinations thereof, and so forth are useable to obtain a replay or extra ball (e.g., for an arcade machine 102 configured with the playfield 302 in a pinball implementation). The strategy generation module 524 is configured to identify these and similar aspects of the rulebook 504 that are usable to increase a gameplay duration and generate a summary and description for inclusion as part of the one or more duration improvement strategies 724 in the strategy guide 116.

In some implementations, the strategy generation module 524 is configured to leverage information described by historical game data in generating the one or more score improvement strategies 722 and the one or more duration improvement strategies 724. For instance, the strategy generation module 524 may analyze game-specific hashes 118 generated for games represented in the one or more leaderboards 714 and identify trends in gameplay sessions associated with highest scores, longest durations, and the like. As an example, the strategy generation module 524 may identify that top-scoring games consistently achieve certain states for a defined set of modes, and include a summary of how to achieve these certain states for the defined set of modes in the one or more score improvement strategies 722. Similarly, the strategy generation module 524 may identify trends in gameplay sessions associated with the longest durations and output a summary of these trends as part of the one or more duration improvement strategies 724 (e.g., "the longest games usually earn extra balls by hitting consecutive ramp shots when lights on the playfield 108 are blue").

The strategy generation module 524 is thus configured to generate descriptive summaries of individual gameplay sessions, historical gameplay sessions, gameplay session comparisons, score improvement strategies, duration improvement strategies, historical gameplay metrics, and combinations thereof for inclusion in the strategy guide 116.

In some implementations, the strategy generation module 524 is configured to output the strategy guide 116 with a share control 726. The share control 726 is representative of a selectable option for the user 104 to share the strategy guide 116 with others. For instance, the share control 726 may be configured to enable posting the strategy guide 116 on one or more social networking accounts associated with the user 104. Alternatively or additionally, the share control 726 may be configured to enable communicating (e.g., via text, email, etc.) the strategy guide 116 from the user device 122 to one or more different computing devices.

In some implementations, the strategy generation module 524 outputs the strategy guide 116 with a save control 728. The save control 728 is representative of a selectable option for the user 104 to save information included in the strategy guide 116 to a user profile associated with the user 104, such as user profile 132. By saving the strategy guide 116, the user 104 can later return to view and compare prior gameplay experiences. For instance, the strategy guide 116 may be viewed together with prior strategy guides generated for a particular arcade machine 102, with strategy guides generated for friends, and so forth. In some implementations, the strategy generation module 524 outputs the strategy guide 116 with a discard control 730. The discard control 730 is representative of a selectable option for the user 104 to preclude storage of data associated with the strategy guide 116 in the user profile 132, or remove data previously stored in the user profile 132.

The strategy guide 116 is thus representative of information generated for a specific rulebook 130 and arcade machine 102 combination. Using the techniques described herein, the information conveyed in the strategy guide 116 is representative of additional information either not designated for output or display by the specific rulebook 130 and/or unable to be displayed by the arcade machine 102 (e.g., given limited characteristics of display 106). Further, the strategy guide 116 is generated for a specific user 104 and a specific gameplay session at the arcade machine 102.

Having considered example systems and techniques for generating a strategy guide based on a game-specific hash summarizing events occurring during gameplay at an arcade machine, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7.

Figure 8:
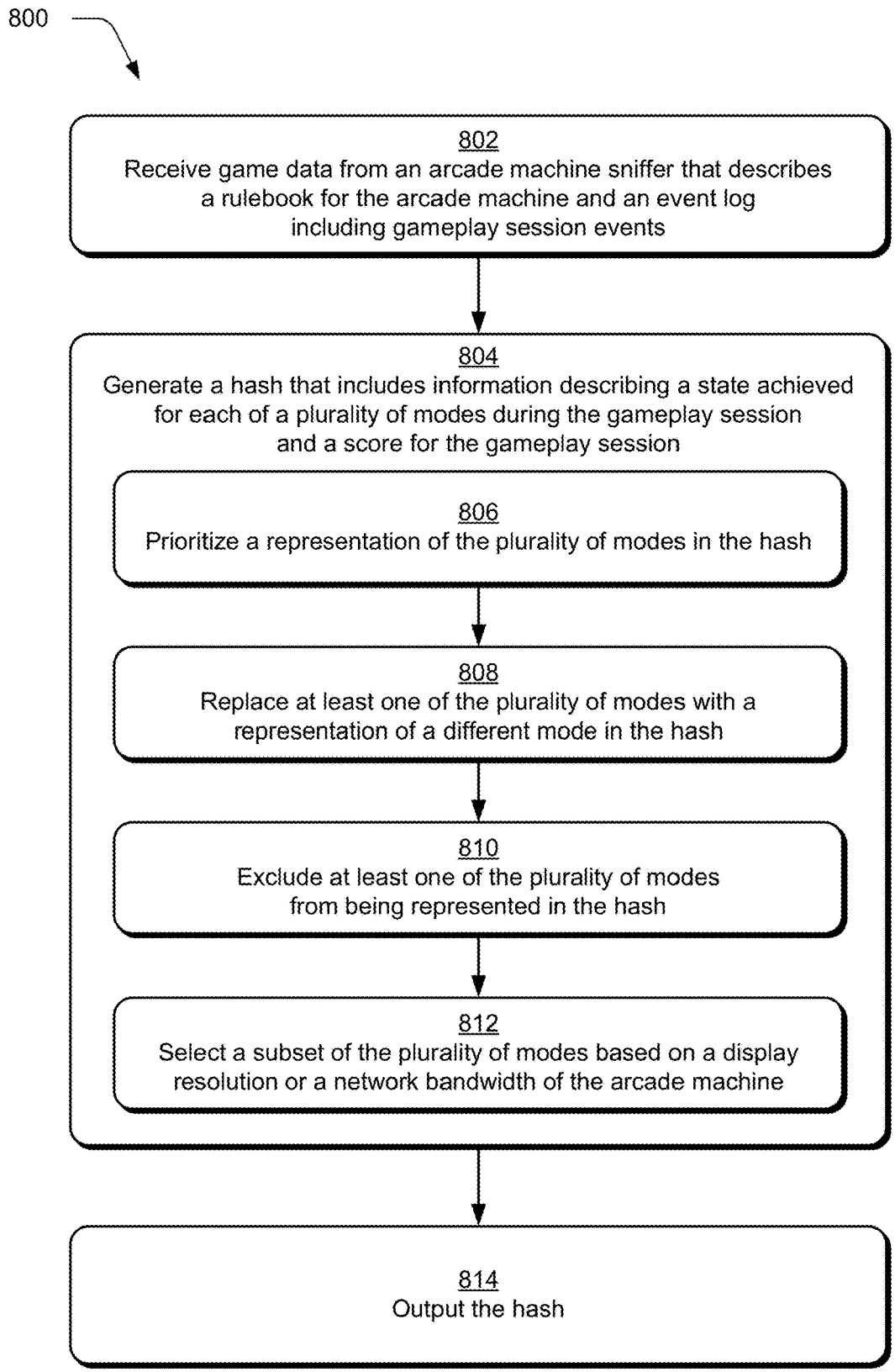
FIG. 8 is a flow diagram depicting a procedure in an example implementation in which an arcade machine generates a game-specific hash.

FIG. 8 depicts a procedure 800 in an example implementation of generating a game-specific hash in accordance with the techniques described herein.

To begin, game data is received from an arcade machine sniffer that describes a rulebook for the arcade machine and an event log including gameplay session events (block 802). The hashing system 112, for instance, receives arcade game data 202 from a sniffer 110 implemented in an arcade machine 102, where the arcade game data 202 includes information specifying a rulebook identifier 204 and an event log 206 for a gameplay session associated with a user 104.

A hash is generated that includes information describing a state achieved for each of a plurality of modes during the gameplay session and a score for the gameplay session (block 804). The hashing module 208, for instance, implements a hashing algorithm 210 and processes the arcade game data 202 using the hashing algorithm 210 to generate a raw hash 212.

In some implementations, generating the hash includes prioritizing a representation of the plurality of modes in the hash (block 806). The hashing module 208, for instance, is configured to prioritize an ordering of modes represented in the raw hash 212 based on various criteria, examples of which include a relative position of a mode or state in a rulebook 130, an annotation in the rulebook 130, an associated point or scoring value in the rulebook 130, user profile data for the user 104, and so forth. In other implementations, generating the hash is performed independent of (i.e., without) prioritizing a representation of the plurality of modes in the hash.

In some implementations, generating the hash includes replacing at least one of the plurality of modes with a representation of a different mode in the hash (block 808). The hashing module 208, for instance, identifies information in the rulebook 130 specifying that certain modes are replacements of, or successors to, other modes and represents the replacement and/or successor modes in place of their counterpart modes in the raw hash 212. In other implementations, generating the hash is performed independent of replacing a representation of one or more of the plurality of modes in the hash.

In some implementations, generating the hash includes excluding at least one of the plurality of modes from being represented in the hash (block 810). The hashing module 208, for instance, may identify that no states associated with a subset of modes defined by the rulebook 130 were unlocked or otherwise achieved during a gameplay session and exclude the subset of modes from being represented in the raw hash 212. In other implementations, generating the hash is performed independent of excluding a representation of one or more of the plurality of modes in the hash, such that all modes defined by a rulebook 130 are represented in the raw hash 212.

In some implementations, generating the hash includes selecting a subset of the plurality of modes based on a display resolution or a network bandwidth of the arcade machine (block 812). The hashing module 208, for instance, identifies that the game-specific hash 118 is to be output as a machine-readable code 120 via a display 106 of the arcade machine 102 and that the display 106 has a limited resolution unable to convey an entirety of the game-specific hash 118 via the machine-readable code 120. Alternatively or additionally, the hashing module 208 identifies that a network bandwidth over which the game-specific hash 118 is to be communicated to the strategy system 114 precludes transmitting an entirety of the game-specific hash 118. In such example implementations, the hashing module 208 is configured to select a subset of modes and/or a subset of associated states for inclusion in the raw hash 212. In other implementations, generating the hash is performed independent of selecting a subset of the plurality of modes for inclusion in the hash, such that all modes defined by a rulebook 130 are represented in the raw hash 212.

The hash is then output (block 814). The hashing system 112, for instance, generates a game-specific hash 118 from the raw hash 212 and provides the game-specific hash 118 to the strategy system 114. In some implementations, the game-specific hash 118 is output via display as a machine-readable code 120 and transmitted to the strategy system 114 by a computing device other than the arcade machine 102 (e.g., via capture by a camera 124 of a user device 122). The hashing system 112 is optionally configured to implement an encoding module 214 to further process the raw hash 212 before outputting the game-specific hash 118 (e.g., by generating one of an encoded hash 220, an encrypted hash 222, or an encrypted encoded hash 224). The output module 226 outputs the game-specific hash 118 directly to the strategy system 114, as a machine-readable code 120, to a user device 122, to a database 128, or combinations thereof.

Figure 9:
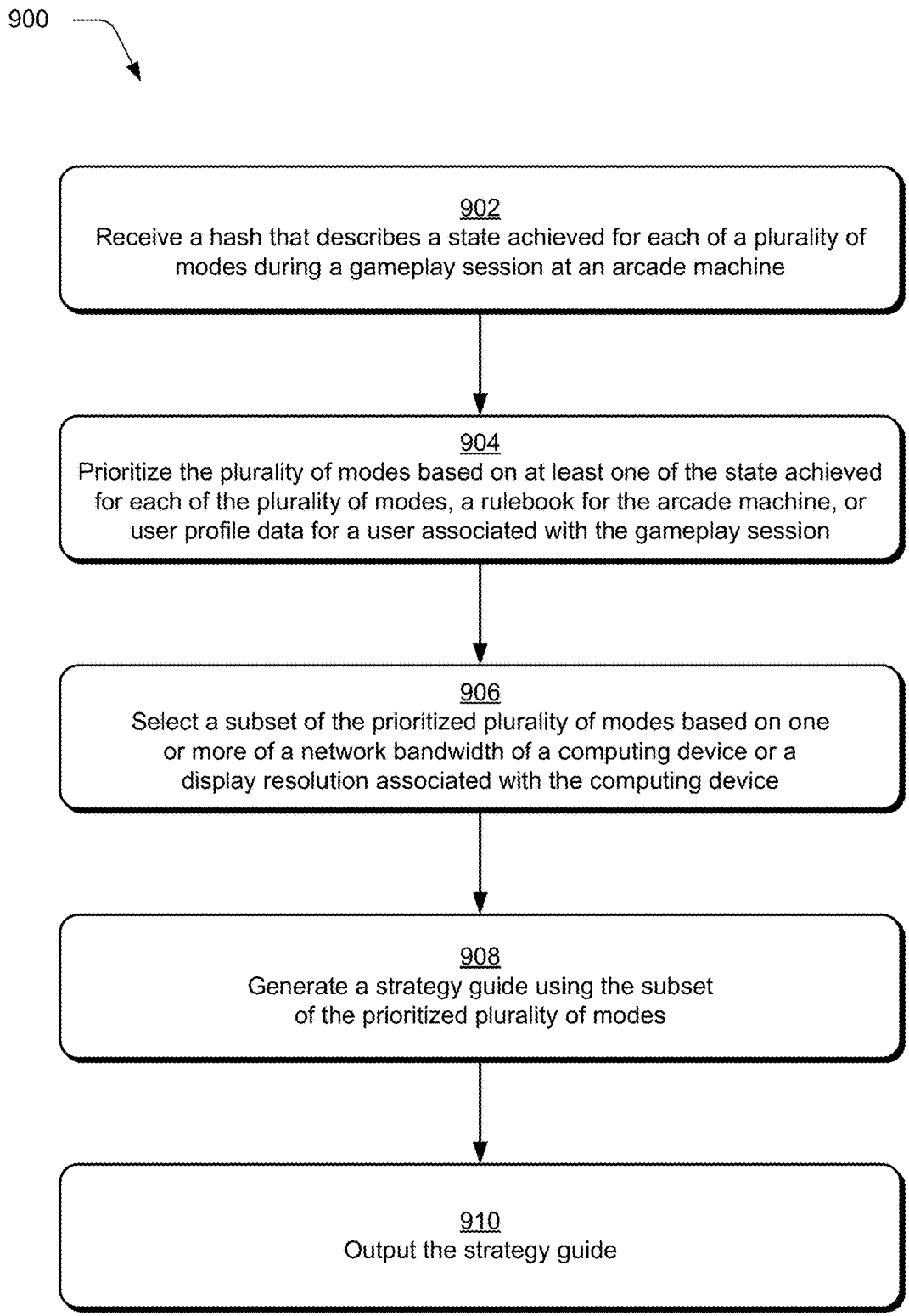
FIG. 9 is a flow diagram depicting a procedure in an example implementation in which a computing device generates a strategy guide based on a game-specific hash.

FIG. 9 depicts a procedure 900 in an example implementation of generating a strategy guide based on a game-specific hash in accordance with the techniques described herein.

To begin, a hash is received that describes a state achieved for each of a plurality of modes during a gameplay session at an arcade machine (block 902). The strategy system 114, for instance, receives the game-specific hash 118 from the hashing system 112.

The plurality of modes are then prioritized based on at least one of the state achieved for each of the plurality of modes, a rulebook for the arcade machine, or user profile data for a user associated with the gameplay session (block 904). The prioritization module 510, for instance, outputs the prioritized modes 512 and the prioritized states 514 based on one or more of information described by the game-specific hash 118, the rulebook 504, or the user profile data 516.

A subset of the prioritized plurality of modes is then selected based on one or more of a network bandwidth of a computing device or a display resolution associated with the computing device (block 906). The optimization module 518, for instance, outputs the prioritized modes subset 520 and the prioritized states subset 522 based on various criteria such as display capabilities and/or a network bandwidth associated with a computing device implementing the strategy system 114. Alternatively or additionally, the optimization module 518 outputs the prioritized modes subset 520 and the prioritized states subset 522 based on display capabilities and/or a network bandwidth associated with a computing device at which the strategy guide 116 is to be output.

A strategy guide is then generated using the subset of the prioritized plurality of modes (block 908). The strategy generation module 524, for instance, generates the strategy guide 116 from the prioritized modes subset 520 and the prioritized states subset 522. The strategy guide is then output (block 910). The strategy generation module 524, for instance, encodes the strategy guide 116 in a machine-readable code 120 and outputs the machine-readable code 120 via a display of a computing device implementing the strategy system 114 (e.g., the display 106). Alternatively or additionally, the strategy generation module 524 directly communicates the strategy guide 116 to one or more computing devices (e.g., the user device 122, the database 128, and so forth).

Having described example procedures in accordance with one or more implementations, consider now an example system and device to implement the various techniques described herein.

Example System and Device

Figure 10:
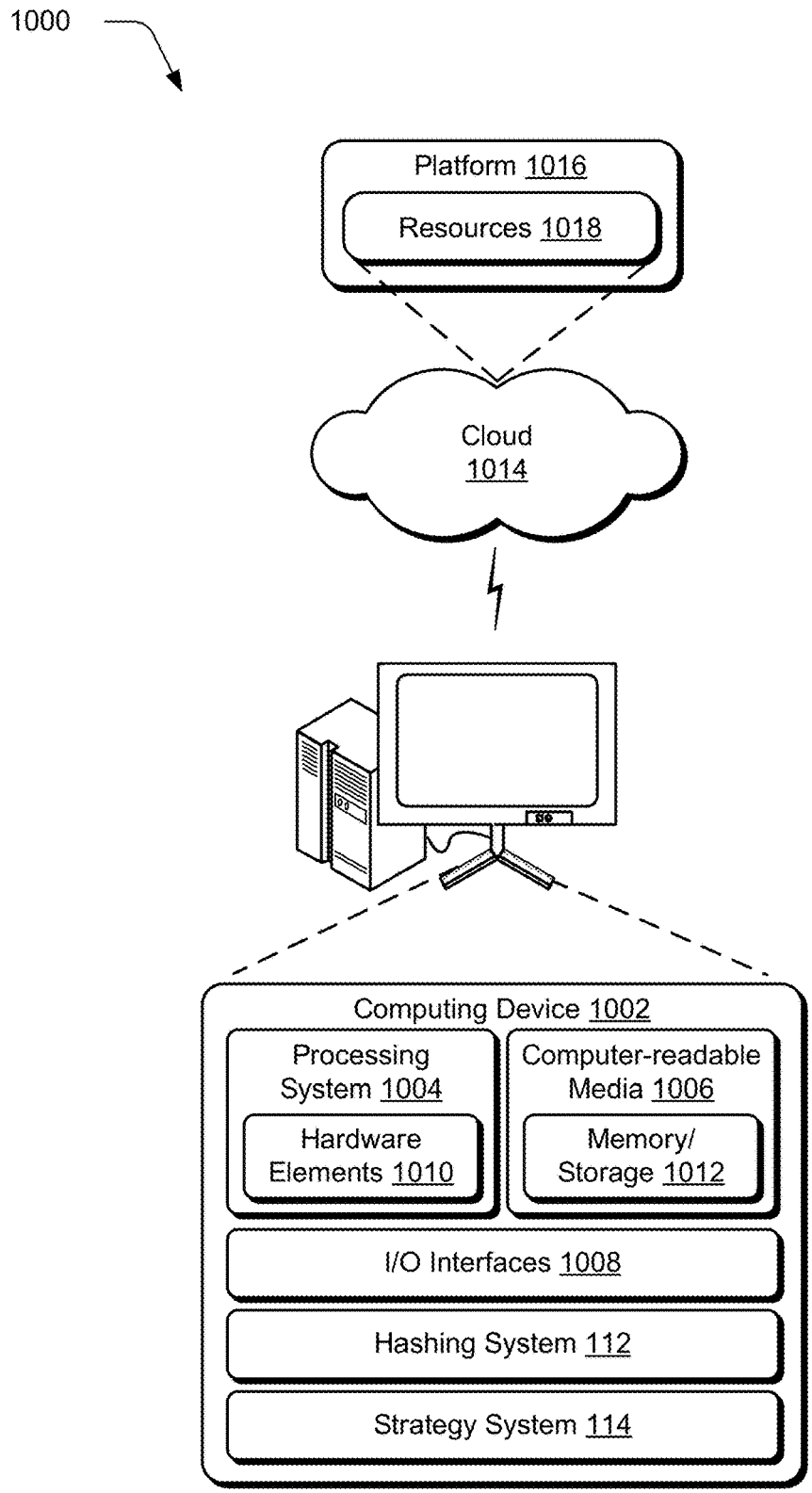
FIG. 10 illustrates an example system including various components of an example device to implement the techniques described with reference to FIGS. 1-9.

FIG. 10 illustrates an example system 1000 that includes an example computing device 1002, which is representative of one or more computing systems and/or devices that implement the various techniques described herein, such as one or more of the arcade machine 102, the user device 122, or the database 128. This is illustrated through inclusion of the hashing system 112 and the strategy system 114. Although illustrated as including both the hashing system 112 and the strategy system 114, in some implementations the computing device 1002 is configured as including only one of the hashing system 112 or the strategy system 114. The computing device 1002 is configured, for example, as a service provider server, as a device associated with a client (e.g., a client device), as an on-chip system, and/or as any other suitable computing device or computing system.

The example computing device 1002 as illustrated includes a processing system 1004, one or more computer-readable media 1006, and at least one input/output (I/O) interface 1008 that are communicatively coupled, one to another. Although not shown, the computing device 1002 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that are configurable as processors, functional blocks, and so forth. For instance, hardware element 1010 is implemented in hardware as an application specific integrated circuit or other logic device formed using one or more semiconductors. The hardware elements 1010 are not limited by the materials from which they are formed, or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 1006 is illustrated as including memory/storage 1012. The memory/storage 1012 represents memory/storage capacity associated with one or more computer-readable media. The memory/storage 1012 is representative of volatile media (such as random-access memory (RAM)) and/or nonvolatile media (such as read only memory (ROM), Flash memory, optical disks, magnetic disks, and so forth). The memory/storage 1012 is configured to include fixed media (e.g., RAM, ROM, a fixed hard drive, and so on) as well as removable media (e.g., Flash memory, a removable hard drive, an optical disc, and so forth). In certain implementations, the computer-readable media 1006 is configured in a variety of other ways as further described below.

Input/output interface(s) 1008 are representative of functionality to allow a user to enter commands and information to computing device 1002 and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 1002, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is further configured to be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that is utilized while computer processing is executed on servers that are remote from the computing device 1002. Resources 1018 also include services provided over the Internet and/or through a subscriber network, such as a cellular or Wi-Fi network.

The platform 1016 is configured to abstract resources and functions to connect the computing device 1002 with other computing devices. The platform 1016 is further configured to abstract scaling of resources to provide a corresponding level of scale to encountered demand for the resources 1018 that are implemented via the platform 1016. Accordingly, in an interconnected device embodiment, implementation of functionality described herein is configured for distribution throughout the system 1000. For example, in some configurations the functionality is implemented in part on the computing device 1002 as well as via the platform 1016 that abstracts the functionality of the cloud 1014.

Conclusion

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   receiving arcade game data from a sniffer in an arcade machine, the arcade game data including information describing a rulebook for the arcade machine and an event log describing a plurality of events during a gameplay session;
   generating a hash based on the arcade game data, the hash including information describing a state achieved for each of a plurality of modes during the gameplay session and a score resulting from the gameplay session; and
   outputting the hash.

2. The method of claim 1, wherein generating the hash comprises prioritizing a representation of the plurality of modes in the hash based on a revision of the rulebook.

3. The method of claim 1, wherein generating the hash comprises prioritizing a representation of the plurality of modes in the hash based on the state achieved for each of the plurality of modes.

4. The method of claim 1, wherein generating the hash comprises replacing one or more of the plurality of modes with a representation of a different mode that was unlocked during the gameplay session by achieving a designated state associated with each of the one or more of the plurality of modes.

5. The method of claim 1, wherein generating the hash comprises excluding at least one of the plurality of modes from being represented in the hash based on one or more of the score resulting from the gameplay session, a duration of the gameplay session, or user profile data for a user associated with the gameplay session.

6. The method of claim 1, wherein generating the hash comprises selecting a subset of the plurality of modes for representation in the hash based on one or more of a display resolution or a network bandwidth of the arcade machine.

7. The method of claim 1, wherein the hash is a numeric string, a hexadecimal string, or an alphanumeric string.

8. The method of claim 1, wherein outputting the hash comprises generating a machine-readable code from the hash and displaying the machine-readable code at a display of the arcade machine.

9. The method of claim 1, wherein outputting the hash comprises transmitting the hash to a client device of a user associated with the gameplay session.

10. The method of claim 1, wherein outputting the hash comprises transmitting the hash to a database via a network.

11. A method implemented by at least one computing device, the method comprising:
   receiving a hash that includes information describing a state achieved for each of a plurality of modes during a gameplay session at an arcade machine and a score resulting from the gameplay session;
   prioritizing the plurality of modes based on at least one of the state achieved for each of the plurality of modes during the gameplay session or user profile data for a user associated with the gameplay session;
   selecting a subset of the prioritized plurality of modes based on one or more of a display resolution or a network bandwidth of the arcade machine;
   generating a strategy guide for the arcade machine using the subset of the prioritized plurality of modes; and outputting the strategy guide.

12. The method of claim 11, wherein the strategy guide includes a description of the score resulting from the gameplay session and a duration of the gameplay session.

13. The method of claim 11, wherein the strategy guide includes at least one of a historical highest score or a historical longest duration for the user associated with the gameplay session.

14. The method of claim 11, wherein the strategy guide includes information describing how the state achieved for each of the plurality of modes during the gameplay session at the arcade machine corresponds to the score resulting from the gameplay session.

15. The method of claim 11, wherein the strategy guide includes at least one recommendation for improving the score resulting from the gameplay session.

16. The method of claim 11, wherein the strategy guide includes at least one recommendation for increasing a duration of the gameplay session.

17. The method of claim 11, wherein the strategy guide includes a selectable option to share information included in the strategy guide with one or more different users.

18. The method of claim 11, wherein outputting the strategy guide comprises at least one of:
generating a machine-readable code for the strategy guide and displaying the machine-readable code at a display of the arcade machine;
transmitting the strategy guide to a client device of the user associated with the gameplay session; or
storing the strategy guide in user profile data stored at a database.

19. The method of claim 11, further comprising generating the hash that includes information describing the state achieved for each of the plurality of modes during the gameplay session at the arcade machine and the score resulting from the gameplay session.

20. A system comprising:
a camera;
one or more processors; and
a computer-readable storage medium storing instructions that are executable by the one or more processors to perform operations comprising:
capturing an image of a hash with the camera, the hash including information describing a state achieved for each of a plurality of modes during a gameplay session at an arcade machine and a score resulting from the gameplay session;
transmitting the information included in the hash to a computing device;
receiving, from the computing device, a strategy guide for the arcade machine that describes the score resulting from the gameplay session and at least one recommendation for improving the score resulting from the gameplay session; and
outputting a display of the strategy guide.

* * * * *